United States Patent
Chun et al.

(10) Patent No.: US 10,531,418 B2
(45) Date of Patent: Jan. 7, 2020

(54) COMMUNICATION METHOD OF USER EQUIPMENT INSTALLED IN VEHICLE IN V2X COMMUNICATION SYSTEM, AND USER EQUIPMENT

(71) Applicant: LG ELECTRONICS INC., Seoul (KR)

(72) Inventors: Sungduck Chun, Seoul (KR); Laeyoung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/557,761

(22) PCT Filed: Mar. 14, 2016

(86) PCT No.: PCT/KR2016/002525
§ 371 (c)(1),
(2) Date: Sep. 12, 2017

(87) PCT Pub. No.: WO2016/144147
PCT Pub. Date: Sep. 15, 2016

(65) Prior Publication Data
US 2018/0077668 A1    Mar. 15, 2018

Related U.S. Application Data

(60) Provisional application No. 62/131,847, filed on Mar. 12, 2015, provisional application No. 62/166,702, filed on May 27, 2015.

(51) Int. Cl.
*H04W 60/04*     (2009.01)
*H04W 48/16*     (2009.01)
(Continued)

(52) U.S. Cl.
CPC ............. *H04W 60/04* (2013.01); *H04W 4/00* (2013.01); *H04W 4/40* (2018.02); *H04W 48/16* (2013.01);
(Continued)

(58) Field of Classification Search
CPC ...... H04W 60/04; H04W 48/16; H04W 76/02
See application file for complete search history.

(56) References Cited

U.S. PATENT DOCUMENTS

2002/0027891 A1 * 3/2002 Mimura ................ H04W 36/22
                                                              370/331
2012/0294236 A1 * 11/2012 Watfa .................... H04W 60/04
                                                              370/328
(Continued)

FOREIGN PATENT DOCUMENTS

KR          100520174       11/2005
KR         1020060066265      6/2006
(Continued)

OTHER PUBLICATIONS

PCT International Application No. PCT/KR2016/002525, Written Opinion of the International Searching Authority dated Jun. 29, 2016, 21 pages.
(Continued)

*Primary Examiner* — Minjung Kim
(74) *Attorney, Agent, or Firm* — Lee Hong Degerman Kang Waimey

(57) ABSTRACT

A V2X communication method that stores system information of a cell connected to a network before being disconnected from the network, generates a connection with a first network node using the stored system information when the power of UE is turned on, transmits to a second network node a connection request message including an indicator indicating that a PDN connection is unnecessary, and
(Continued)

receives from the second network node a connection approval message indicating the completion of a network connection without PDN connection, and user equipment are disclosed.

8 Claims, 14 Drawing Sheets

(51) Int. Cl.
*H04W 4/04* (2009.01)
*H04W 76/02* (2009.01)
*H04W 76/10* (2018.01)
*H04W 4/00* (2018.01)
*H04W 60/00* (2009.01)
*H04W 4/40* (2018.01)
*H04W 4/70* (2018.01)
*H04W 76/14* (2018.01)

(52) U.S. Cl.
CPC ........... *H04W 60/00* (2013.01); *H04W 76/10* (2018.02); *H04W 4/70* (2018.02); *H04W 76/14* (2018.02)

(56) References Cited

U.S. PATENT DOCUMENTS

| | | | |
|---|---|---|---|
| 2014/0241184 A1* | 8/2014 | Sami | H04W 36/24 370/252 |
| 2016/0140842 A1* | 5/2016 | Park | G08G 1/0112 340/905 |
| 2016/0219520 A1* | 7/2016 | Hara | H04W 48/16 |

FOREIGN PATENT DOCUMENTS

| | | | |
|---|---|---|---|
| KR | 20060098729 A | * | 9/2006 |
| KR | 1020060098729 | | 9/2006 |
| KR | 1020080108279 | | 12/2008 |

OTHER PUBLICATIONS

3rd Generation Partnership Project (3GPP), "Technical Specification Group Core Network and Terminals; Non-Access-Stratum (NAS) protocol for Evolved Packet System (EPS); Stage 3 (Release 13)," 3GPP TS 24.301 V13.0.0, Dec. 2014, 373 pages.

* cited by examiner

COMMUNICATION METHOD OF USER EQUIPMENT INSTALLED IN VEHICLE IN V2X COMMUNICATION SYSTEM, AND USER EQUIPMENT

CROSS-REFERENCE TO RELATED APPLICATIONS

This application is the National Stage filing under 35 U.S.C. 371 of International Application No. PCT/KR2016/002525, filed on Mar. 14, 2016, which claims the benefit of U.S. Provisional Application Nos. 62/131,847 filed on Mar. 12, 2015 and 62/166,702 filed on May 27, 2015, the contents of which are all hereby incorporated by reference herein in their entirety.

TECHNICAL FIELD

The present invention relates to a wireless communication system, and more particularly, to a communication method of a user equipment installed in a vehicle in a V2X communication system.

BACKGROUND ART

Wireless access systems have been widely deployed to provide various types of communication services such as voice or data. In general, a wireless access system is a multiple access system that may support communication of multiple users by sharing available system resources (e.g., a bandwidth, transmission power, etc.). For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a multi carrier frequency division multiple access (MC-FDMA) system.

DISCLOSURE OF THE INVENTION

Technical Task

One technical task of the present invention is to propose a communication mechanism with another UE of a UE and network nodes in a V2X (vehicle to everything) communication system.

Another technical task of the present invention is to simplify and improve a network access process of a UE in a V2X communication environment.

Further technical task of the present invention is to enable an operation to fit a V2X communication environment by improving a communication process of a power-on UE.

The technical problems solved by the present invention are not limited to the above technical problems and other technical problems which are not described herein will become apparent to those skilled in the art from the following description.

Technical Solutions

In one technical aspect of the present invention, provided herein is a method for a user equipment (UE) to communicate with network nodes, including storing system information of a connected cell prior to releasing an access to a network, if a power of the UE is turned on, generating a connection to a first network node using the stored system information, transmitting a second network node an attach request message including an indicator indicating that PDN (packet data network) connectivity is not necessary, and receiving an attach accept message indicating that a network access without the PDN connectivity is complete from the second network node.

The stored system information may be used if a location of the UE is equal to that before releasing the access to the network.

The stored system information may be used if a preset timer does not expire after a timing of releasing the access to the network.

The stored system information may be used if a cell ID sensed after turning on the power of the UE is equal to a cell ID included in the stored system information.

The first network node may be an eNB (evolved Node B) and the second network node may be an MME (mobility management entity).

The attach request message may further include an indicator indicating that assignment of an IP is not necessary.

Information on a serving gateway (SGW) may not be included in the attach accept message.

The UE may include a device supportive of V2X (vehicle to everything) communication.

In another technical aspect of the present invention, provided herein is a UE (user equipment), including a transmitting unit, a receiving unit, and a processor configured to operate by being connected to the transmitting unit and the receiving unit, wherein the processor is further configured to store system information of a connected cell prior to releasing an access to a network, establish (or generate) a connection to a first network node using the stored system information if a power of the UE is turned on, control the transmitting unit to transmit a second network node an attach request message including an indicator indicating that PDN connectivity is not necessary, and control the receiving unit to receive an attach accept message indicating that a network access without the PDN connectivity is complete from the second network node.

In another technical aspect of the present invention, provided herein is a communication method, including receiving information on a resource region used for a V2X message transmission by a UE operating as an RSU (road side unit) from a base station, storing information on the resource region prior to releasing an access to a network, and if a power of the first UE is turned on, initiating the V2X communication with a second UE in consideration of the stored information on the resource region before performing an attach procedure to the network.

The initiating the communication may include performing the V2X communication using a part except the stored resource region among reserved resource regions to be used before performing the attach procedure to the network.

In another technical aspect of the present invention, provided herein is a UE, including a transmitting unit, a receiving unit, and a processor configured to operate by being connected to the transmitting unit and the receiving unit, wherein the processor is further configured to control the receiving unit to receive information on a resource region used for a V2X message transmission by a UE operating as an RSU from a base station, store information on the resource region prior to releasing an access to a network, and control the transmitting unit and the receiving unit to if a power of the first UE is turned on, initiate the V2X communication with a second UE in consideration of the stored information on the resource region before performing an attach procedure to the network.

Advantageous Effects

As is apparent from the above description, the embodiments of the present invention have the following effects.

First of all, in a V2X communication system, a UE can communicate with another UE and network nodes in an efficient manner.

Secondly, as a network access process of a UE is improved in a V2X communication system, a quick access is enabled and a network signaling load is reduced.

Thirdly, as a communication mechanism of a power-on UE is improved in a V2X communication system, an instant communication with another UE is enabled.

The effects of the present invention are not limited to the above-described effects and other effects which are not described herein may be derived by those skilled in the art from the following description of the embodiments of the present invention. That is, effects which are not intended by the present invention may be derived by those skilled in the art from the embodiments of the present invention.

DESCRIPTION OF DRAWINGS

The accompanying drawings, which are included to provide a further understanding of the invention, illustrate embodiments of the invention and together with the description serve to explain the principle of the invention. The technical features of the present invention are not limited to specific drawings and the features shown in the drawings are combined to construct a new embodiment. Reference numerals of the drawings mean structural elements.

BEST MODE FOR INVENTION

Figure 1:
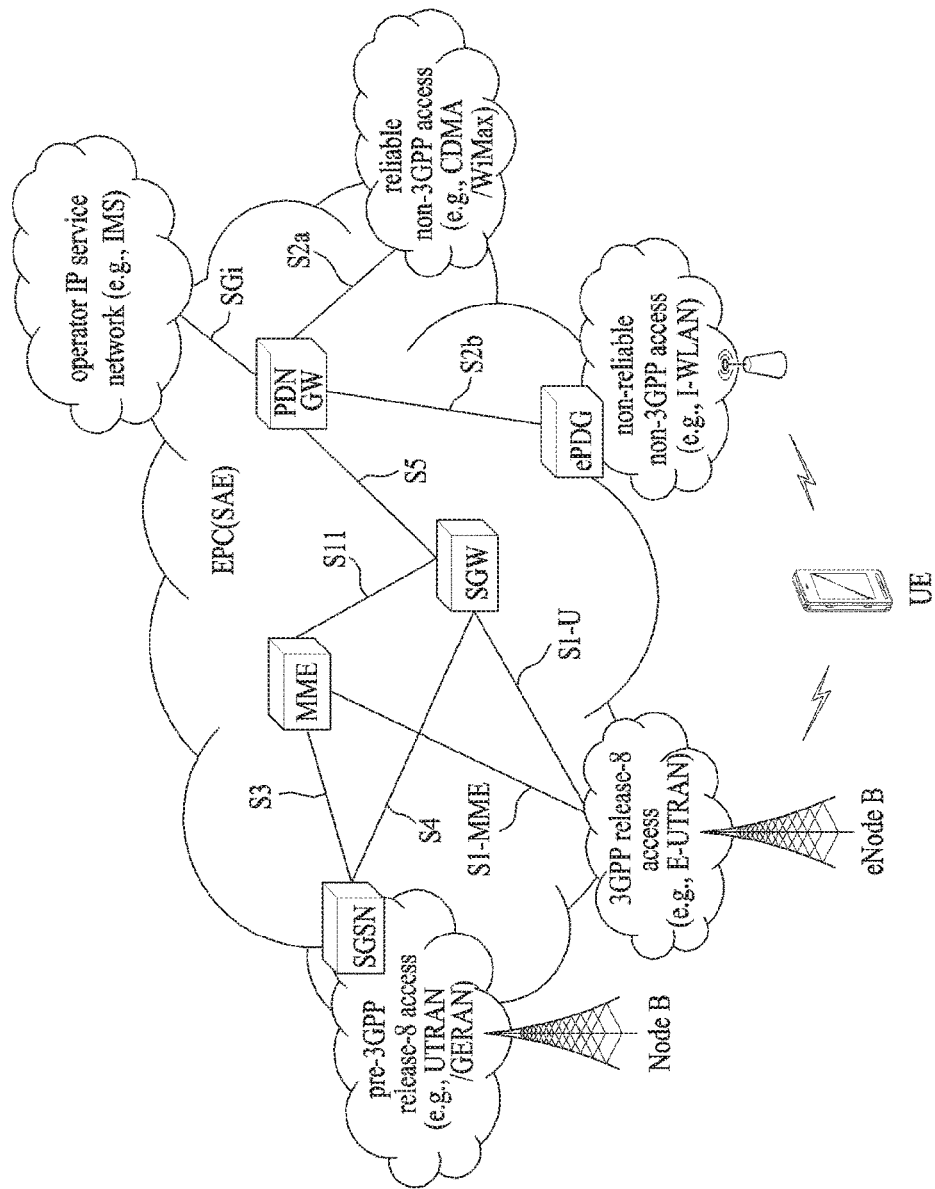
FIG. 1 is a diagram illustrating a brief structure of an evolved packet system (EPS) that includes an evolved packet core (EPC).

Although the terms used in the present invention are selected from generally known and used terms, terms used herein may be varied depending on operator's intention or customs in the art, appearance of new technology, or the like. In addition, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. In addition, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

In describing the present invention, if it is determined that the detailed description of a related known function or construction renders the scope of the present invention unnecessarily ambiguous, the detailed description thereof will be omitted.

In the entire specification, when a certain portion "comprises or includes" a certain component, this indicates that the other components are not excluded and may be further included unless specially described otherwise. The terms "unit", "-or/er" and "module" described in the specification indicate a unit for processing at least one function or operation, which may be implemented by hardware, software or a combination thereof. The words "a or an", "one", "the" and words related thereto may be used to include both a singular expression and a plural expression unless the context describing the present invention (particularly, the context of the following claims) clearly indicates otherwise.

The embodiments of the present invention can be supported by the standard documents disclosed in any one of wireless access systems, such as an IEEE 802.xx system, a 3rd Generation Partnership Project (3GPP) system, a 3GPP Long Term Evolution (LTE) system, and a 3GPP2 system. That is, the steps or portions, which are not described in order to make the technical spirit of the present invention clear, may be supported by the above documents.

In addition, all the terms disclosed in the present document may be described by the above standard documents. In particular, the embodiments of the present invention may be supported by at least one of P802.16-2004, P802.16e-2005, P802.16.1, P802.16p and P802.16.1b documents, which are the standard documents of the IEEE 802.16 system.

Hereinafter, the preferred embodiments of the present invention will be described with reference to the accompanying drawings. It is to be understood that the detailed description which will be disclosed along with the accompanying drawings is intended to describe the exemplary embodiments of the present invention, and is not intended to describe a unique embodiment which the present invention can be carried out.

It should be noted that specific terms disclosed in the present invention are proposed for convenience of description and better understanding of the present invention, and the use of these specific terms may be changed to another format within the technical scope or spirit of the present invention.

First of all, the terms used in this specification can be defined as follows.

UMTS (Universal Mobile Telecommunications System): a GSM (Global System for Mobile Communication) based third generation mobile communication technology developed by the 3GPP.

EPS (Evolved Packet System): a network system that includes an EPC (Evolved Packet Core) which is an IP (Internet Protocol) based packet switched core network and an access network such as LTE and UTRAN. This system is the network of an evolved version of the UMTS.

NodeB: a base station of GERAN/UTRAN. This base station is installed outdoor and its coverage has a scale of a macro cell.

eNodeB: a base station of LTE. This base station is installed outdoor and its coverage has a scale of a macro cell.

UE (User Equipment): the UE may be referred to as terminal, ME (Mobile Equipment), MS (Mobile Station), etc. Also, the UE may be a portable device such as a notebook computer, a cellular phone, a PDA (Personal Digital Assistant), a smart phone, and a multimedia device. Alternatively, the UE may be a non-portable device such as a PC (Personal Computer) and a vehicle mounted device. The term "UE", as used in relation to MTC, can refer to an MTC device.

HNB (Home NodeB): a base station of UMTS network. This base station is installed indoor and its coverage has a scale of a micro cell.

HeNB (Home eNodeB): a base station of an EPS network. This base station is installed indoor and its coverage has a scale of a micro cell.

MME (Mobility Management Entity): a network node of an EPS network, which performs mobility management (MM) and session management (SM).

PDN-GW (Packet Data Network-Gateway)/PGW: a network node of an EPS network, which performs UE IP address allocation, packet screening and filtering, charging data collection, etc.

SGW (Serving Gateway): a network node of an EPS network, which performs mobility anchor, packet routing, idle-mode packet buffering, and triggering of an MME's UE paging.

NAS (Non-Access Stratum): an upper stratum of a control plane between a UE and an MME. This is a functional layer for transmitting and receiving a signaling and traffic message between a UE and a core network in an LTE/UMTS protocol stack, and supports mobility of a UE, and supports a session management procedure of establishing and maintaining IP connection between a UE and a PDN GW.

PDN (Packet Data Network): a network in which a server supporting a specific service (e.g., a Multimedia Messaging Service (MMS) server, a Wireless Application Protocol (WAP) server, etc.) is located.

PDN connection: a logical connection between a UE and a PDN, represented as one IP address (one IPv4 address and/or one IPv6 prefix).

RAN (Radio Access Network): a unit including a Node B, an eNode B, and a Radio Network Controller (RNC) for controlling the Node B and the eNode B in a 3GPP network, which is present between UEs and provides a connection to a core network.

HLR (Home Location Register)/HSS (Home Subscriber Server): a database having subscriber information in a 3GPP network. The HSS can perform functions such as configuration storage, identity management, and user state storage.

PLMN (Public Land Mobile Network): a network configured for the purpose of providing mobile communication services to individuals. This network can be configured per operator.

Proximity Services (or ProSe Service or Proximity-based Service): a service that enables discovery between physically proximate devices, and mutual direct communication/communication through a base station/communication through the third party. At this time, user plane data are exchanged through a direct data path without through a 3GPP core network (for example, EPC).

ProSe Communication: communication between two or more ProSe-enabled UEs in proximity by means of a ProSe Communication path. Unless explicitly stated otherwise, the term "ProSe Communication" refers to any/all of the following: ProSe E-UTRA Communication, ProSe-assisted WLAN direct communication between two UEs, ProSe Group Communication and ProSe Broadcast Communication.

ProSe E-UTRA Communication: ProSe Communication using a ProSe E-UTRA Communication path.

ProSe-assisted WLAN direct communication: ProSe Communication using a ProSe-assisted WLAN direct communication path.

ProSe Communication path: communication path supporting ProSe Communication. The ProSe E-UTRA Communication path could be established between the ProSe-enabled UEs using E-UTRA, or routed via local eNB(s). The ProSe-assisted WLAN direct communication path may be established directly between the ProSe-enabled UEs using WLAN.

EPC Path (or infrastructure data path): the user plane communication path through EPC.

ProSe Discovery: a process that identifies that a UE that is ProSe-enabled is in proximity of another, using E-UTRA.

ProSe Group Communication: one-to-many ProSe Communication, between more than two ProSe-enabled UEs in proximity, by means of a common communication path established between the ProSe-enabled UEs.

ProSe UE-to-Network Relay: is a form of relay in which a ProSe-enabled Public Safety UE acts as a communication relay between a ProSe-enabled Public Safety UE and the ProSe-enabled network using E-UTRA.

ProSe UE-to-UE Relay: is a form of relay in which a ProSe-enabled Public Safety UE acts as a ProSe Communication relay between two or more ProSe-enabled Public Safety UEs.

Remote UE: This is a Prose-enabled public safety UE connected to EPC through Prose UE-to-Network Relay without service from E-UTRAN in a UE-to-Network Relay operation, that is, Prose-enabled public safety UE configured to receive PDN connection, whereas this is a Prose-enabled public safety UE that performs communication with other Prose-enabled public safety UE through a Prose UE-to-UE Relay in a UE-to-UE relay operation.

ProSe-enabled Network: a network that supports ProSe Discovery, ProSe Communication and/or ProSe-assisted WLAN direct communication. Hereinafter, the ProSe-enabled Network may simply be referred to as a network.

ProSe-enabled UE: a UE that supports ProSe Discovery, ProSe Communication and/or ProSe-assisted WLAN direct communication. Hereinafter, the ProSe-enabled UE and the ProSe-enabled Public Safety UE may be referred to as UE.

Proximity: proximity is determined ("a UE is in proximity of another UE") when given proximity criteria are fulfilled. Proximity criteria can be different for discovery and communication.

SLP (SUPL Location Platform): entity that controls Location Service Management and Position Determination. The SLP includes SLC(SUPL Location Center) function and SPC(SUPL Positioning Center) function. Details of the SLP will be understood with reference to Open Mobile Alliance (OMA) standard document OMA AD SUPL: "Secure User Plane Location Architecture".

USD (User Service Description): application/service layer transmits USD, which includes TMGI (Temporary Mobile Group Identity) for each MBMS service, start and end time of session, frequencies, and MBMS service area identities (MBMS SAIs) information belonging to MBMS service area, to the UE. Details of the USD will be understood with reference to 3GPP TS 23.246.

ISR (Idle mode Signaling Reduction): When a UE frequently moves between E-UTRAN and UTRAN/GERAN, waste of network resources occurs due to a repeated position registration process. As a method for reducing such a waste, when the UE is in an idle mode, after position registration for MME and SGSN (hereinafter, these two nodes will be referred to as mobility management node) is performed through the E-UTRAN and the UTRAN/GERAN, a separate position registration is not performed in the case that movement between two RATs (Radio Access Technologies) which are already registered or cell reselection is performed. Therefore, if DL (downlink) data to the corresponding UE is arrived, paging is transmitted to the E-UTRAN and the UTRAN/GERAN at the same time to successfully discover the UE, whereby the DL data may be transferred to the discovered UE. [see 3GPP TS 23.401 and 3GPP TS 23.060]

Mission Critical Push To Talk: a group communication service that provides a fast establishment time, a capability capable of processing a large scaled group, powerful security, and priority handling.

ANDSF (Access Network Discovery and Selection Function): This is one of network entities for providing a policy for discovering and selecting an access that can be used by a UE on an operator basis.

ISRP (Inter-System Routing Policy): This is a protocol defined by the operator to indicate which one will be used by the UE for routing of IP traffic among several radio access interfaces. The ISRP may include three types of protocols as follows, as a policy for defining an access network preferred (i.e., having a high priority) or restricted to route/steer a packet service (or an IP flow or IP traffic or applications). That is, the ISRP may be divided into an IP flow mobility (IFOM) protocol, a multi access PDN connectivity (MAPCON) protocol, and a non-seamless WLAN offload (NSWO) protocol as follows.

IFOM (IP Flow Mobility) protocol: This protocol is in regards to a list in which access technologies/access networks to be used by the UE are arranged according to a priority, when traffic matched to a specific IP traffic filter can be routed on a specific APN or on a random APN. Further, this protocol may designate for which radio access the traffic matched to the specific IP traffic filter is limited on the specific APN or on the random APN.

MAPCON (Multi Access PDN Connectivity) protocol: This protocol is a list in which the access technologies/access networks to be used by the UE are arranged according to the priority when a PDN connection for the specific APN can be routed. Further, this protocol may designate for which radio access a PDN connection to a specific APN will be limited.

NSWO(Non-seamless WLAN offload) protocol: This protocol designates whether certain traffic will be offloaded or not offloaded non-seamlessly to a WLAN.

ISMP (Inter-System Mobility Policy): This is a set of protocols defined by an operator to have an impact on an inter-system mobility decision made by the UE. When the UE can route IP traffic on a single radio access interface, the UE may use ISMP to select the most appropriate access technology type or access network in a given time.

RAN rule: This is a rule received from the network and is called RAN support information. The RAN rule is also called WLAN interworking supported by the RAN used without ANDSF ISRP/ISMP. When the RAN rule for moving traffic to the WLAN is satisfied, an access stratum (AS) layer of the UE delivers a move-traffic-to-WLAN indication and a WLAN identifier together to a higher layer of the UE. Alternatively, when the RAN rule for moving the traffic to the 3GPP access is satisfied, the AS layer of the UE delivers a move-traffic-from-WLAN indication to the higher layer of the UE. 3GPP. 3GPP TS 23.401, TS 23.060, TS 23.402, TS 36.300, TS 36.304, TS 36.331, TS 25.304, and TS 25.331 may be incorporated herein for detailed descriptions on the RAN rule.

Local Operating Environment Information: This is a set of implementation specific parameters which describe the local environment in which the UE is operating.

Network-Based IP Flow Mobility (NBIFOM): This is IP flow mobility based on network based mobility protocol (GTP or PMIP).

UE-initiated NBIFOM: This is NBIFOM in which the UE initiates IP flow mobility.

Network-initiated NBIFOM: This is NBIFOM in which the network initiates IP flow mobility.

Multi-access PDN connection: This is a PDN connection in which traffic can be routed through the 3GPP access and/or the WLAN access. Each IP flow is routed only through one access at one instance.

Routing filter: This is a set of IP header parameter values/ranges of a packet flow used to identify IP flow for the purpose of routing.

Routing access type: This is a type of an access for routing a set of IP flows of PDN connection (3GPP access or WLAN access.

Routing Rule (RR): This is a set of information that enables association between the routing filter and the routing access type.

1. Evolved Packet Core (EPC)

FIG. 1 is a schematic diagram showing the structure of an evolved packet system (EPS) including an evolved packet core (EPC).

The EPC is a core element of system architecture evolution (SAE) for improving performance of 3GPP technology. SAE corresponds to a research project for determining a network structure supporting mobility between various types of networks. For example, SAE aims to provide an optimized packet-based system for supporting various radio access technologies and providing an enhanced data transmission capability.

Specifically, the EPC is a core network of an IP mobile communication system for 3GPP LTE and can support real-time and non-real-time packet-based services. In conventional mobile communication systems (i.e. second-generation or third-generation mobile communication systems), functions of a core network are implemented through a circuit-switched (CS) sub-domain for voice and a packet-switched (PS) sub-domain for data. However, in a 3GPP LTE system which is evolved from the third generation communication system, CS and PS sub-domains are unified into one IP domain. That is, in 3GPP LTE, connection of terminals having IP capability can be established through an IP-based business station (e.g., an eNodeB (evolved Node B)), EPC, and an application domain (e.g., IMS). That is, the EPC is an essential structure for end-to-end IP services.

The EPC may include various components. FIG. 1 shows some of the components, namely, a serving gateway (SGW), a packet data network gateway (PDN GW), a mobility management entity (MME), a serving GPRS (general packet radio service) supporting node (SGSN) and an enhanced packet data gateway (ePDG).

The SGW operates as a boundary point between a radio access network (RAN) and a core network and maintains a data path between an eNodeB and the PDN GW. When. When a terminal moves over an area served by an eNodeB, the SGW functions as a local mobility anchor point. That is, packets. That is, packets may be routed through the SGW for mobility in an evolved UMTS terrestrial radio access network (E-UTRAN) defined after 3GPP release-8. In addition, the SGW may serve as an anchor point for mobility of another 3GPP network (a RAN defined before 3GPP release-8, e.g., UTRAN or GERAN (global system for mobile communication (GSM)/enhanced data rates for global evolution (EDGE) radio access network).

The PDN GW corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an unreliable network such as an interworking wireless local area network (I-WLAN) and a reliable network such as a code division multiple access (CDMA) or WiMax network).

Although the SGW and the PDN GW are configured as separate gateways in the example of the network structure of FIG. 1, the two gateways may be implemented according to a single gateway configuration option.

The MME performs signaling and control functions for supporting access of a UE for network connection, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., a GPRS network).

The ePDG serves as a security node for a non-3GPP network (e.g., an I-WLAN, a Wi-Fi hotspot, etc.).

As described above with reference to FIG. 1, a terminal having IP capabilities may access an IP service network (e.g., an IMS) provided by an operator via various elements in the EPC not only based on 3GPP access but also on non-3GPP access.

Additionally, FIG. 1 shows various reference points (e.g. S1-U, S1-MME, etc.). In 3GPP, a conceptual link connecting two functions of different functional entities of an E-UTRAN and an EPC is defined as a reference point. Table 1 is a list of the reference points shown in FIG. 1. Various reference points may be present in addition to the reference points in Table 1 according to network structures.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |
| S11 | Reference point between an MME and an SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points shown in FIG. 1, S2a and S2b correspond to non-3GPP interfaces. S2a is a reference point which provides reliable non-3GPP access and related control and mobility support between PDN GWs to a user plane. S2b is a reference point which provides related control and mobility support between the ePDG and the PDN GW to the user plane.

Figure 2:
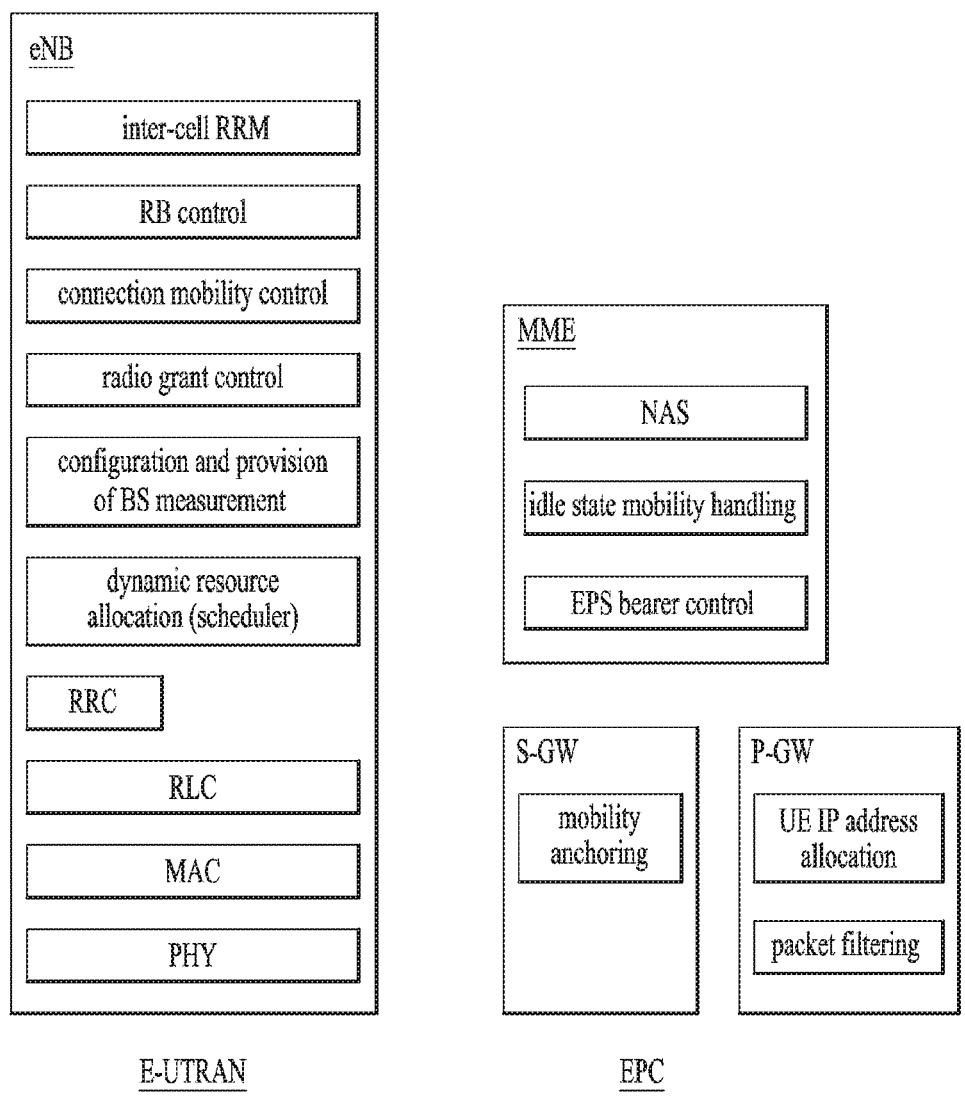
FIG. 2 is an exemplary diagram illustrating an architecture of a general E-UTRAN and a general EPC.

FIG. 2 is a diagram exemplarily illustrating architectures of a typical E-UTRAN and EPC.

As shown in the figure, while radio resource control (RRC) connection is activated, an eNodeB may perform routing to a gateway, scheduling transmission of a paging message, scheduling and transmission of a broadcast channel (BCH), dynamic allocation of resources to a UE on uplink and downlink, configuration and provision of eNodeB measurement, radio bearer control, radio admission control, and connection mobility control. In the EPC, paging generation, LTE_IDLE state management, ciphering of the user plane, SAE bearer control, and ciphering and integrity protection of NAS signaling.

Figure 3:
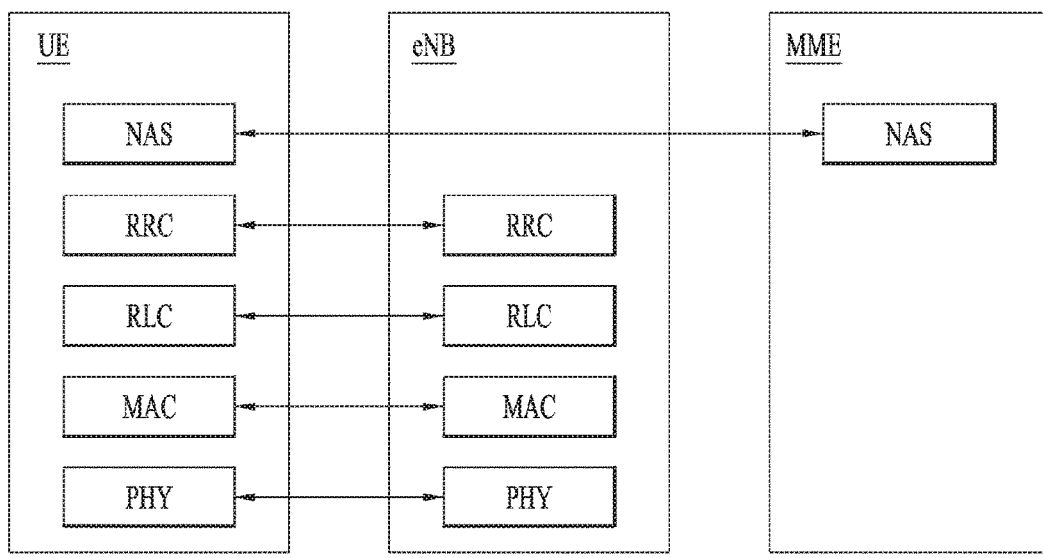
FIG. 3 is an exemplary diagram illustrating a structure of a radio interface protocol on a control plane.
Figure 4:
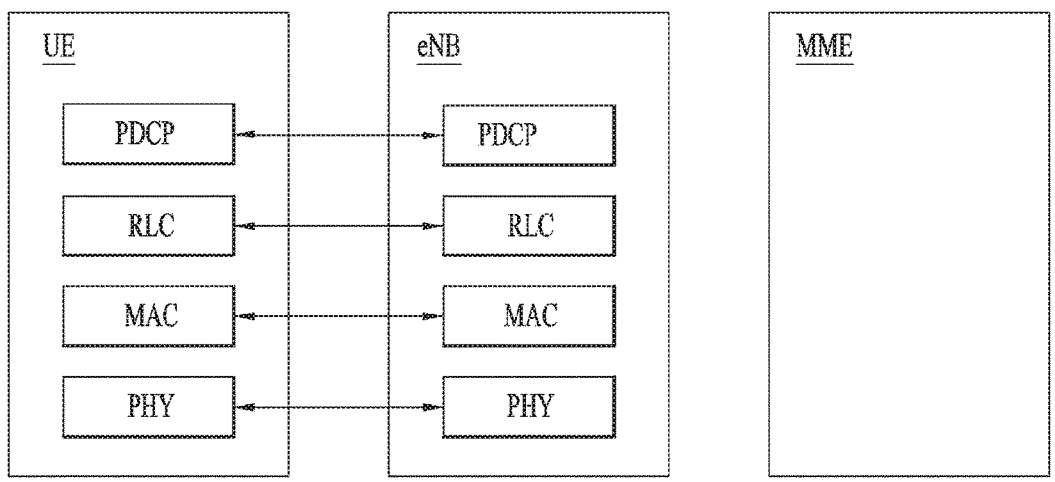
FIG. 4 is an exemplary diagram illustrating a structure of a radio interface protocol on a user plane.

FIG. 3 is a diagram exemplarily illustrating the structure of a radio interface protocol in a control plane between a UE and a base station, and FIG. 4 is a diagram exemplarily illustrating the structure of a radio interface protocol in a user plane between the UE and the base station.

The radio interface protocol is based on the 3GPP wireless access network standard. The radio interface protocol horizontally includes a physical layer, a data link layer, and a networking layer. The radio interface protocol is divided into a user plane for transmission of data information and a control plane for delivering control signaling which are arranged vertically.

The protocol layers may be classified into a first layer (L1), a second layer (L2), and a third layer (L3) based on the three sublayers of the open system interconnection (OSI) model that is well known in the communication system.

Hereinafter, description will be given of a radio protocol in the control plane shown in FIG. 3 and a radio protocol in the user plane shown in FIG. 4.

The physical layer, which is the first layer, provides an information transfer service using a physical channel. The physical channel layer is connected to a medium access control (MAC) layer, which is a higher layer of the physical layer, through a transport channel Data is transferred between the physical layer and the MAC layer through the transport channel Transfer of data between different physical layers, i.e., a physical layer of a transmitter and a physical layer of a receiver is performed through the physical channel.

The physical channel consists of a plurality of subframes in the time domain and a plurality of subcarriers in the frequency domain. One subframe consists of a plurality of symbols in the time domain and a plurality of subcarriers. One subframe consists of a plurality of resource blocks. One resource block consists of a plurality of symbols and a plurality of subcarriers. A Transmission Time Interval (TTI), a unit time for data transmission, is 1 ms, which corresponds to one subframe.

According to 3GPP LTE, the physical channels present in the physical layers of the transmitter and the receiver may be divided into data channels corresponding to Physical Downlink Shared Channel (PDSCH) and Physical Uplink Shared Channel (PUSCH) and control channels corresponding to Physical Downlink Control Channel (PDCCH), Physical Control Format Indicator Channel (PCFICH), Physical Hybrid-ARQ Indicator Channel (PHICH) and Physical Uplink Control Channel (PUCCH).

The second layer includes various layers. First, the MAC layer in the second layer serves to map various logical channels to various transport channels and also serves to map various logical channels to one transport channel. The MAC layer is connected with an RLC layer, which is a higher layer, through a logical channel. The logical channel is broadly divided into a control channel for transmission of information of the control plane and a traffic channel for transmission of information of the user plane according to the types of transmitted information.

The radio link control (RLC) layer in the second layer serves to segment and concatenate data received from a higher layer to adjust the size of data such that the size is suitable for a lower layer to transmit the data in a radio interval.

The Packet Data Convergence Protocol (PDCP) layer in the second layer performs a header compression function of reducing the size of an IP packet header which has a relatively large size and contains unnecessary control information, in order to efficiently transmit an IP packet such as an IPv4 or IPv6 packet in a radio interval having a narrow bandwidth. In addition, in LTE, the PDCP layer also performs a security function, which consists of ciphering for preventing a third party from monitoring data and integrity protection for preventing data manipulation by a third party.

The Radio Resource Control (RRC) layer, which is located at the uppermost part of the third layer, is defined only in the control plane, and serves to configure radio bearers (RBs) and control a logical channel, a transport channel, and a physical channel in relation to reconfiguration and release operations. The RB represents a service provided by the second layer to ensure data transfer between a UE and the E-UTRAN.

If an RRC connection is established between the RRC layer of the UE and the RRC layer of a wireless network, the UE is in the RRC Connected mode. Otherwise, the UE is in the RRC Idle mode.

Hereinafter, description will be given of the RRC state of the UE and an RRC connection method. The RRC state refers to a state in which the RRC of the UE is or is not logically connected with the RRC of the E-UTRAN. The RRC state of the UE having logical connection with the RRC of the E-UTRAN is referred to as an RRC_CONNECTED state. The RRC state of the UE which does not have logical connection with the RRC of the E-UTRAN is referred to as an RRC_IDLE state. A UE in the RRC_CONNECTED state has RRC connection, and thus the E-UTRAN may recognize presence of the UE in a cell unit. Accordingly, the UE may be efficiently controlled. On the other hand, the E-UTRAN cannot recognize presence of a UE which is in the RRC_IDLE state. The UE in the RRC_IDLE state is managed by a core network in a tracking area (TA) which is an area unit larger than the cell. That is, for the UE in the RRC_IDLE state, only presence or absence of the UE is recognized in an area unit larger than the cell. In order for the UE in the RRC_IDLE state to be provided with a usual mobile communication service such as a voice service and a data service, the UE should transition to the RRC_CONNECTED state. A TA is distinguished from another TA by a tracking area identity (TAI) thereof. A UE may configure the TAI through a tracking area code (TAC), which is information broadcast from a cell.

When the user initially turns on the UE, the UE searches for a proper cell first. Then, the UE establishes RRC connection in the cell and registers information thereabout in the core network. Thereafter, the UE stays in the RRC_IDLE state. When necessary, the UE staying in the RRC_IDLE state selects a cell (again) and checks system information or paging information. This operation is called camping on a cell. Only when the UE staying in the RRC_IDLE state needs to establish RRC connection, does the UE establish RRC connection with the RRC layer of the E-UTRAN through the RRC connection procedure and transition to the RRC_CONNECTED state. The UE staying in the RRC_IDLE state needs to establish RRC connection in many cases. For example, the cases may include an attempt of a user to make a phone call, an attempt to transmit data, or transmission of a response message after reception of a paging message from the E-UTRAN.

The non-access stratum (NAS) layer positioned over the RRC layer performs functions such as session management and mobility management.

Hereinafter, the NAS layer shown in FIG. 3 will be described in detail.

The eSM (evolved Session Management) belonging to the NAS layer performs functions such as default bearer management and dedicated bearer management to control a UE to use a PS service from a network. The UE is assigned a default bearer resource by a specific packet data network (PDN) when the UE initially accesses the PDN. In this case, the network allocates an available IP to the UE to allow the UE to use a data service. The network also allocates QoS of a default bearer to the UE. LTE supports two kinds of bearers. One bearer is a bearer having characteristics of guaranteed bit rate (GBR) QoS for guaranteeing a specific bandwidth for transmission and reception of data, and the other bearer is a non-GBR bearer which has characteristics of best effort QoS without guaranteeing a bandwidth. The default bearer is assigned to a non-GBR bearer. The dedicated bearer may be assigned a bearer having QoS characteristics of GBR or non-GBR.

A bearer allocated to the UE by the network is referred to as an evolved packet service (EPS) bearer. When the EPS bearer is allocated to the UE, the network assigns one ID. This ID is called an EPS bearer ID. One EPS bearer has QoS characteristics of a maximum bit rate (MBR) and/or a guaranteed bit rate (GBR).

Figure 5:
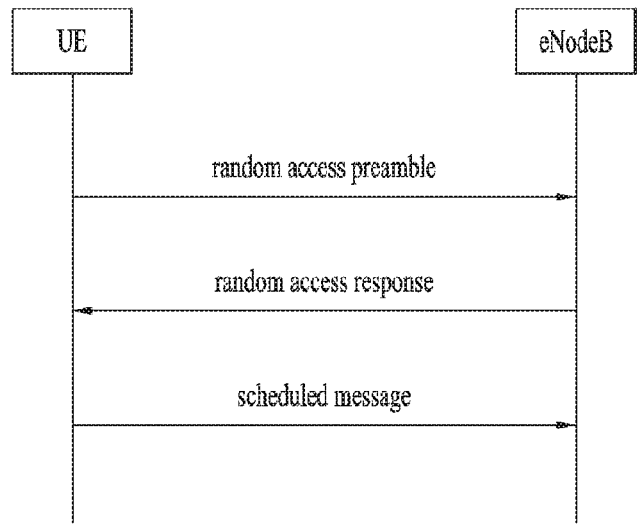
FIG. 5 is a flow chart illustrating a random access procedure.

FIG. 5 is a flowchart illustrating a random access procedure in 3GPP LTE.

The random access procedure is performed for a UE to obtain UL synchronization with an eNB or to be assigned a UL radio resource.

The UE receives a root index and a physical random access channel (PRACH) configuration index from an eNodeB. Each cell has 64 candidate random access preambles defined by a Zadoff-Chu (ZC) sequence. The root index is a logical index used for the UE to generate 64 candidate random access preambles.

Transmission of a random access preamble is limited to a specific time and frequency resources for each cell. The PRACH configuration index indicates a specific subframe and preamble format in which transmission of the random access preamble is possible.

The UE transmits a randomly selected random access preamble to the eNodeB. The UE selects a random access preamble from among 64 candidate random access preambles and the UE selects a subframe corresponding to the PRACH configuration index. The UE transmits the selected random access preamble in the selected subframe.

Upon receiving the random access preamble, the eNodeB transmits a random access response (RAR) to the UE. The RAR is detected in two steps. First, the UE detects a PDCCH masked with a random access (RA)-RNTI. The UE receives an RAR in a MAC (medium access control) PDU (protocol data unit) on a PDSCH indicated by the detected PDCCH.

Figure 6:
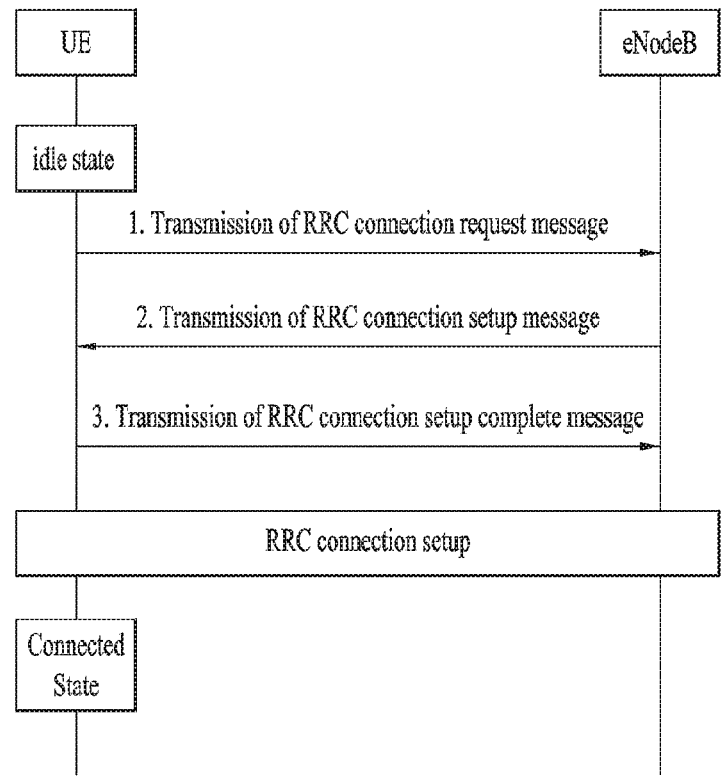
FIG. 6 is a diagram illustrating a connection procedure in a radio resource control (RRC) layer.

FIG. 6 illustrates a connection procedure in a radio resource control (RRC) layer.

As shown in FIG. 6, the RRC state is set according to whether or not RRC connection is established. An RRC state indicates whether or not an entity of the RRC layer of a UE has logical connection with an entity of the RRC layer of an eNodeB. An RRC state in which the entity of the RRC layer of the UE is logically connected with the entity of the RRC layer of the eNodeB is called an RRC connected state. An RRC state in which the entity of the RRC layer of the UE is not logically connected with the entity of the RRC layer of the eNodeB is called an RRC idle state.

A UE in the Connected state has RRC connection, and thus the E-UTRAN may recognize presence of the UE in a cell unit. Accordingly, the UE may be efficiently controlled. On the other hand, the E-UTRAN cannot recognize presence of a UE which is in the idle state. The UE in the idle state is managed by the core network in a tracking area unit which is an area unit larger than the cell. The tracking area is a unit of a set of cells. That is, for the UE which is in the idle state, only presence or absence of the UE is recognized in a larger area unit. In order for the UE in the idle state to be provided with a usual mobile communication service such as a voice service and a data service, the UE should transition to the connected state.

When the user initially turns on the UE, the UE searches for a proper cell first, and then stays in the idle state. Only when the UE staying in the idle state needs to establish RRC connection, the UE establishes RRC connection with the RRC layer of the eNodeB through the RRC connection procedure and then performs transition to the RRC connected state.

The UE staying in the idle state needs to establish RRC connection in many cases. For example, the cases may include an attempt of a user to make a phone call, an attempt to transmit data, or transmission of a response message after reception of a paging message from the E-UTRAN.

In order for the UE in the idle state to establish RRC connection with the eNodeB, the RRC connection procedure needs to be performed as described above. The RRC connection procedure is broadly divided into transmission of an RRC connection request message from the UE to the eNodeB, transmission of an RRC connection setup message from the eNodeB to the UE, and transmission of an RRC connection setup complete message from the UE to eNodeB, which are described in detail below with reference to FIG. 6.

When the UE in the idle state desires to establish RRC connection for reasons such as an attempt to make a call, a data transmission attempt, or a response of the eNodeB to paging, the UE transmits an RRC connection request message to the eNodeB first.

Upon receiving the RRC connection request message from the UE, the ENB accepts the RRC connection request of the UE when the radio resources are sufficient, and then transmits an RRC connection setup message, which is a response message, to the UE.

Upon receiving the RRC connection setup message, the UE transmits an RRC connection setup complete message to the eNodeB. Only when the UE successfully transmits the RRC connection setup message, does the UE establish RRC connection with the eNodeB and transition to the RRC connected mode.

2. V2X (Vehicle to Everything) Communication

Figure 7:
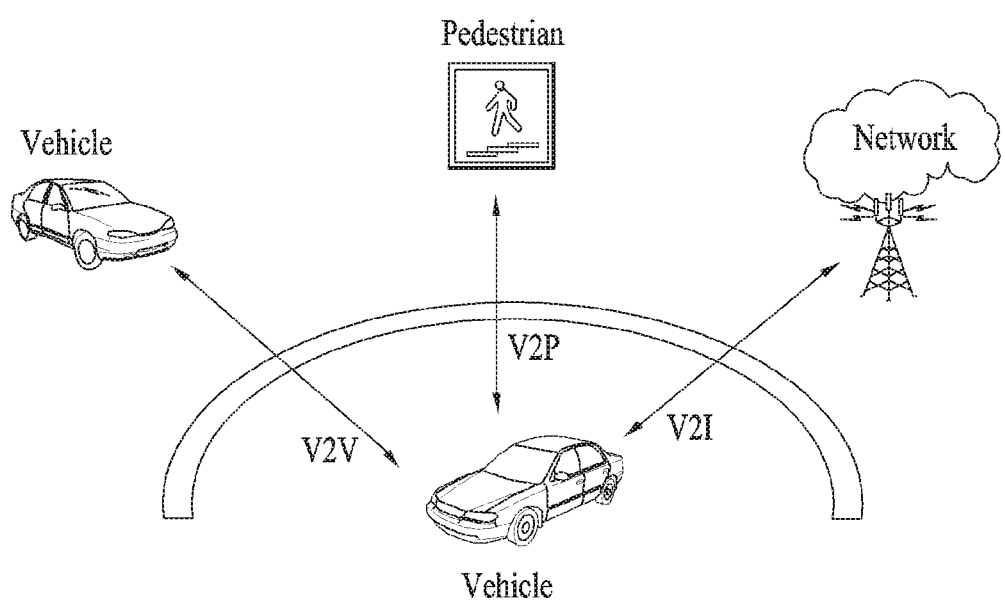
FIG. 7 is a diagram showing a V2X (vehicle to everything) communication environment.

FIG. 7 is a diagram showing a V2X (vehicle to everything) communication environment.

If a vehicle accident occurs, many lives are lost and serious property damage is caused. Hence, the demand for a technology capable of securing pedestrian's safety as well as vehicle boarded person's safety is increasingly rising. Hence, a vehicle-specified hardware and software based technology is grafted onto a vehicle.

An LTE based V2X (vehicle-to-everything) communication technology having started from 3GPP reflects the tendency of grafting an IT (information technology) technology onto a vehicle. Connectivity function is applied to some kinds of vehicles, and many efforts are continuously made to research and develop V2V (Vehicle-to-Vehicle) communication, V2I (Vehicle-to-Infrastructure) communication, V2P (Vehicle-to-Pedestrian) communication, and V2N (Vehicle-to-Network) communication through evolution of communication functions.

According to V2X communication, a vehicle consistently broadcasts information on its own locations, speeds, directions, etc. Having received the broadcasted information, a nearby vehicle utilizes the information for accident prevention by recognizing movements of other vehicles moving nearby.

Namely, in a similar manner that an individual person carries a user equipment in shape of a smartphone, a smartwatch or the like, a user equipment (hereinafter abbreviated UE) in specific shape is installed in each vehicle. Here, a UE installed in a vehicle means a device actually provided with a communication service from a communication network. For example, the UE installed in the vehicle can be provided with a communication service by being connected to an eNB.

Yet, various items should be considered for a process for implementing V2X communication in a vehicle. This is because astronomical costs are required for the installation of traffic safety facilities such as V2X base station and the like. Namely, in order to support V2X communication on all vehicle-movable roads, it is necessary to install hundreds or thousands of V2X base stations or more. Moreover, since each network node accesses Internet or a central control server using a wired network basically for stable communication with a server, installation and maintenance costs of the wired network are high.

Therefore, proposed in the following are a method of efficiently performing V2X communication and a scenario and infrastructure for implementing the same.

3. Proposed V2X Communication Method

Prior to the description of the proposed V2X communication method, several kinds of terms to be used in the following specification are defined first.

RSU (road side unit): This is an entity supportive of V2I communication and means an entity capable of performing a transmission/reception to/from a UE using a V2I application. The RSU can be implemented in an eNB or UE (particularly, a stationary UE). An eNB or UE operating as RSU collects information (e.g., traffic light information, traffic volume information, etc.) related to traffic safety and/or information on nearby vehicle movement, transmits information to another UE becoming a target of V2I communication, and receives information from another UE.

V2I communication: This is a type of V2X communication. A UE and RSU that use V2I application become main agents of the communication.

V2N communication: This is a type of V2X communication. A UE and serving entity that use V2N application become main agents of the communication and communicate with each other through an LTE network entity.

V2P communication: This is a type of V2X communication. Two UEs that use V2P application become main agents of the communication.

V2V communication: This is a type of V2X communication. Two UEs that use V2V application become main agents of the communication. V2V communication differs from V2P communication in the following. In the V2P communication, a prescribed UE becomes a UE of a pedestrian. In the V2V communication, a prescribed UE becomes a UE of a vehicle.

Uu interface (or, E-UTRAN Uu interface): This means an interface between a UE and an eNB defined in LTE/LTE-A. With respect to a relay node, this interface may mean an interface between a relay node and a UE.

Un interface: This means an interface between a relay node and an eNB. This interface means an interface used for transmission and reception performed in MBSFN (MBMS (multimedia broadcast/multicast services) over single frequency network) subframe.

PC5 interface: This means an interface used for direct communication between two UEs. This interface is used for communication between devices supportive of ProSE (proximity service).

DSRC (dedicated short range communications): This means a protocol and standard specification used for short-range or medium-range wireless communication for vehicles. Communication is performed using an interface different from the Uu, Un and PC5 interfaces.

In the following description, V2X communication methods according to various scenarios and situations are proposed through FIGS. 8 to 15. FIGS. 9 to 15 are diagram showing V2X communication methods according to proposed embodiments. Prior to the description of the proposed V2X communication method, a network attach procedure is described with reference to FIG. 8.

Figure 8:
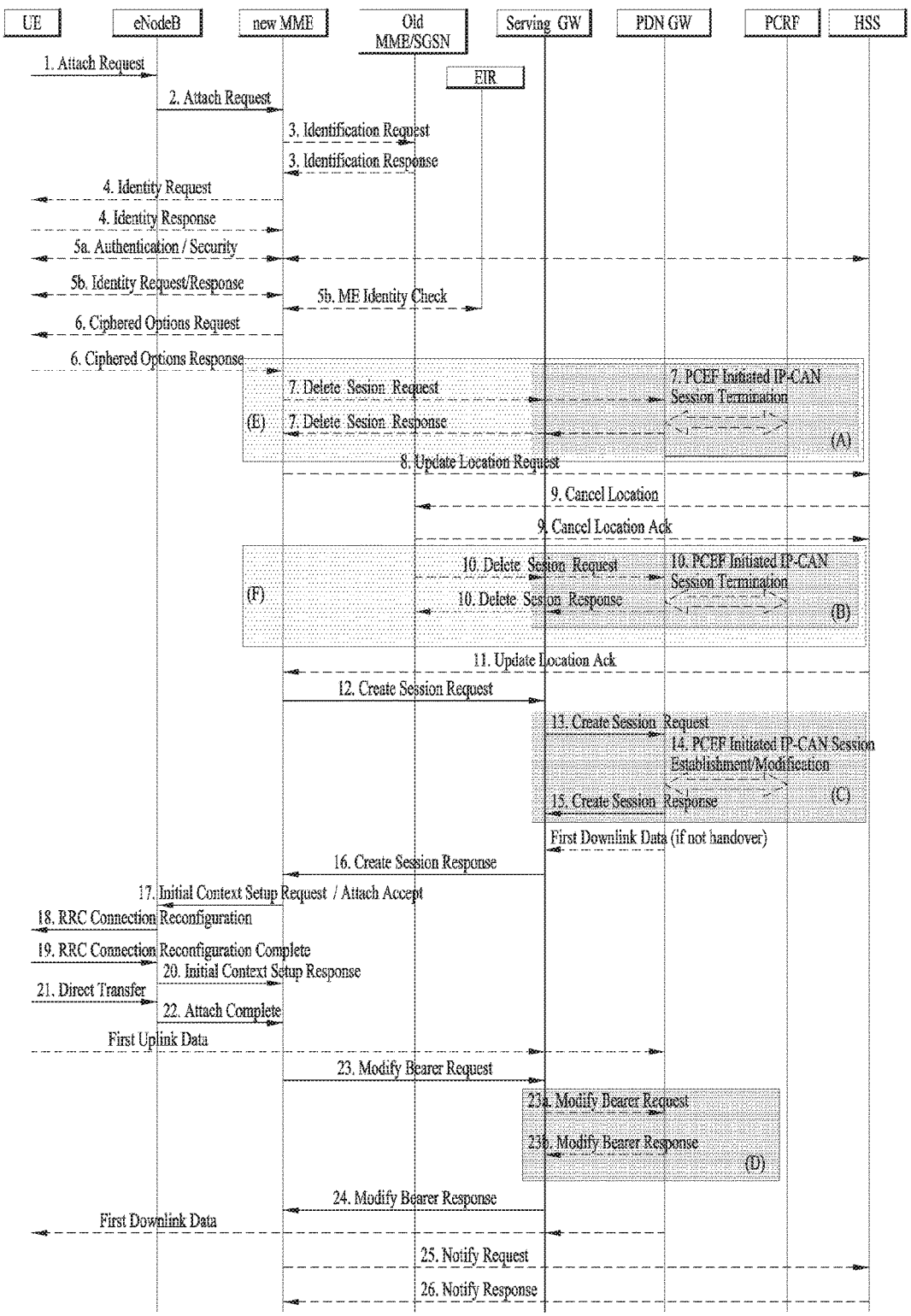
FIG. 8 is a diagram showing a network attach procedure of a UE.

According to the attach procedure shown in FIG. 8, a UE initiates an access to a network by delivering an attach request message to an MME via an eNB. Having received the attach request made by the UE, the MME initiates a process for generating a PDN connectivity of the UE (i.e., a process for assigning an IP) via SGW and PGW. Namely, as a power of the UE is turned on, while the attach procedure of the UE is performed, a process for generating the PDN connectivity is necessarily involved.

Meanwhile, the PDN connectivity generated process (i.e., the IP assigned process) in the attach procedure of the UE is performed through lots of signaling between network nodes. Hence, in case that V2X communication between UEs should be performed urgently, it may not be preferable that the UE waits until the generation of the PDN connectivity is completed.

Figure 9:
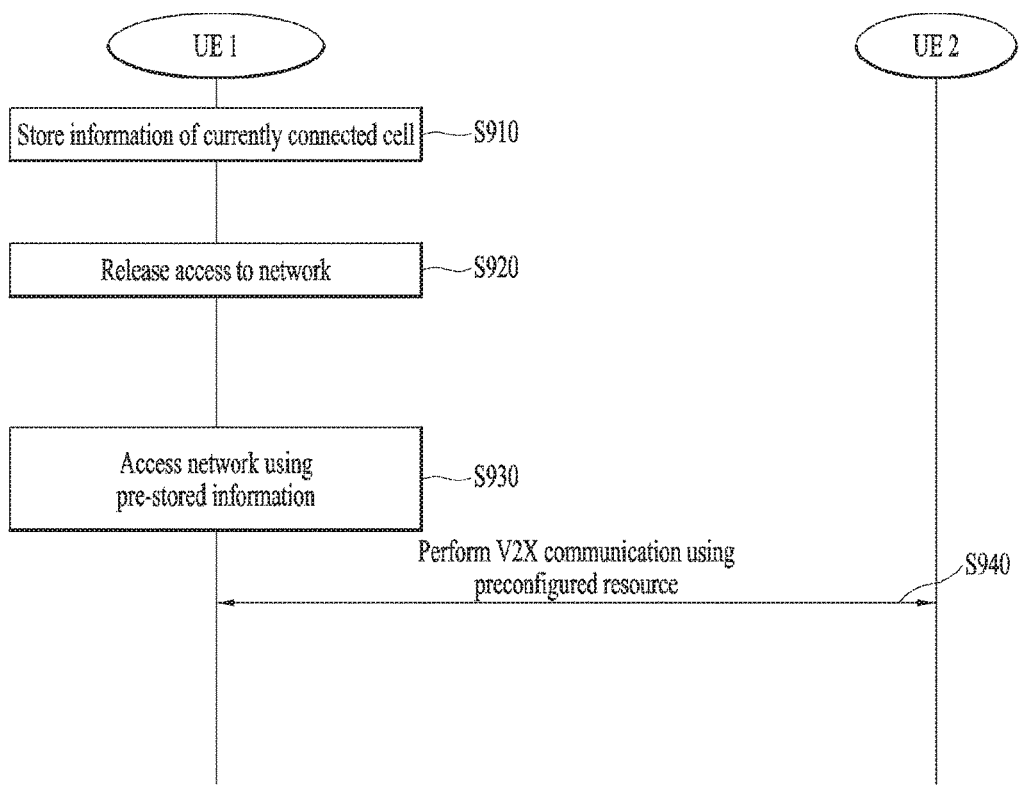
FIGS. 9 to 15 are diagram showing V2X communication methods according to proposed embodiments.
Figure 10:
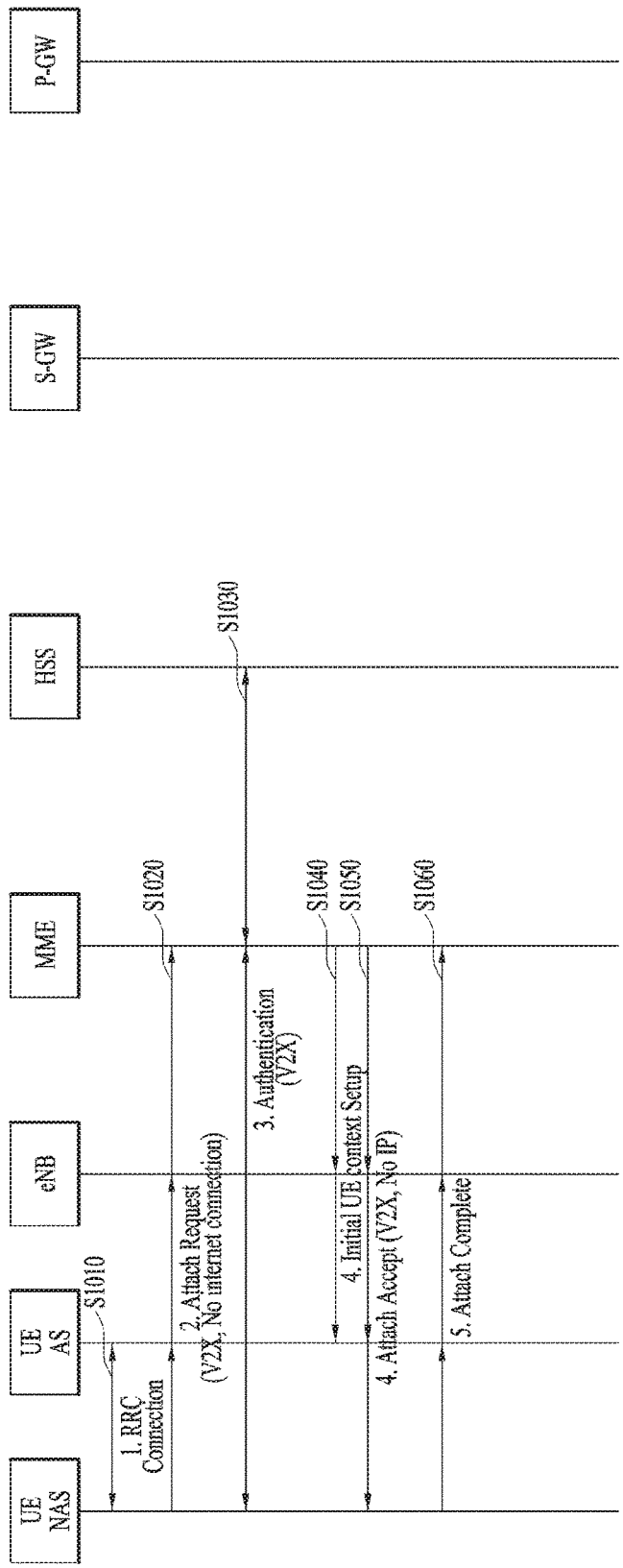
Figure 11:
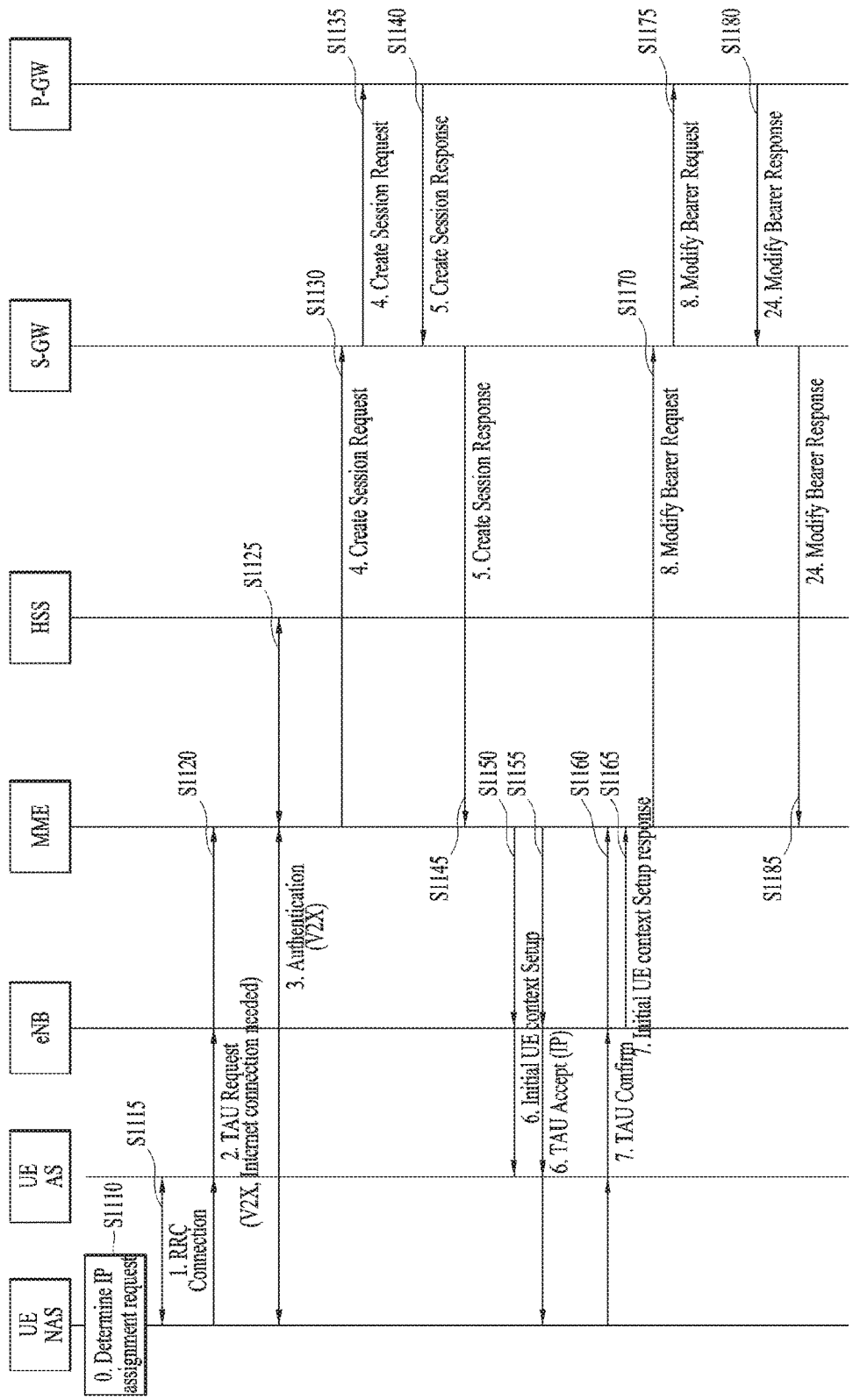

In FIGS. 9 to 11, a V2X communication method for improving the above described contents is proposed. In FIG. 9, UE 1 is installed in a vehicle and is a UE supportive of V2X communication. A user of the UE 1 is a driver of the vehicle having the UE 1 installed therein and is in a situation of arriving at a destination by driving the vehicle, parking the vehicle and then turning off an engine.

Generally, if an engine of a vehicle is started, a driver of the vehicle starts to drive the vehicle immediately. Yet, an attach procedure of a UE takes about 1 minute in general. Hence, although the engine of the vehicle has been started, the UE 1 installed in the vehicle may not complete a network access yet and be in a state that V2X communication cannot be performed in the course of driving the vehicle.

To solve such a problem, the UE 1 stores (or saves) information of a currently connected cell before the access is released from the network [S910]. 'Before the access is released' means 'before the engine of the UE 1 installed vehicle is turned off'. Before the engine of the vehicle is turned off, the UE 1 stores system information of a currently connected cell and releases the access from the network [S920].

Subsequently, if the engine of the vehicle is started again, The UE 1 accesses the network using pre-stored information [S930]. Although the UE 1 does not select a cell to camp on newly, since the UE 1 has the information on the cell, which was stored before the release from the network, in advance, the UE 1 can access the network using the pre-stored system information. This is because after turning off an engine of a vehicle, the probability for the vehicle to move is extremely low. So to speak, since a vehicle does not move if an engine of the vehicle is turned off. If the engine is started again (i.e., a power of the UE 1 is turned on as the UE 1 awakes from a sleep mode or a power saving mode), it is highly probable that the UE 1 accesses the same cell, which was accessed before the access release from the network, again. Hence, before the reception of the information of the transmitting cell is completed in a currently located cell, the UE 1 may perform an attach procedure to the network or the V2X communication using the cell information previously stored before the access release.

On the other hand, in exceptional cases, while the engine of the UE 1 installed vehicle is turned off, a location of the vehicle may be changed (e.g., a case that the vehicle is towed away, etc.). In this case, if the location of the UE 1 is changed, system information of the cell stored in the UE 1 is not applied to a new cell. To solve such a problem, prior to accessing a network using pre-stored information, the UE 1 can check whether the UE 1 exists at the same location before the UE 1 is released from the access using location information. The location information may include information that can be checked through GPS (global positioning system). As a result from checking the location information, if the UE 1 exists at the same location before the access release, the UE 1 accesses the network using the pre-stored information. On the other hand, if the UE 1 moves to another location different from the location before the access release, the UE 1 may perform the attach procedure according to the procedure described with reference to FIG. 8.

For another example, system information of a cell, which has been retained before an engine of a vehicle is started again, may be changed. If information of a cell is changed, since the UE 1 is unable to use the pre-stored information intactly, the UE 1 should receive new system information to perform an attach procedure. Hence, the UE 1 may apply a timer to determine whether the pre-stored cell information is outdated. Namely, the UE 1 sets a timer indicating a time interval for retaining information of a currently connected cell. If an access is released from the network, the UE 1 retains the information of the cell during the corresponding time interval only. If the timer expires, the UE 1 should receive information of a new cell instead of retaining the information pre-stored in the course of accessing the network. Such a timer value may be set at the UE 1 through an RRC message or delivered to the UE 1 through an NAS message.

For further example, in order to secure that the UE 1 is located at the cell identical to that before the access release from the network, the UE 1 may check an ID of a cell if an engine of the vehicle is started. Namely, instead of newly checking all system information of a cell, the UE 1 checks an ID of a cell, thereby confirming that the UE 1 is still located at the cell stored to the UE 1. In such an embodiment, an ID of a cell should be understood as including information such as PCI (physical cell ID) code transmitted through a physical layer to identify a cell as well as an identifier of a cell transmitted through SIB (system information block) of a cell.

Meanwhile, the information of cell checked by the UE 1 may include information on a resource used for Prose (proximity service), i.e., D2D communication as well as information directly transmitted through SIB in a cell. For example, information on a resource used for D2D communication means a resource that can be used freely for V2X communication despite failing to be allocated to the UE 1 in a specific area from the network. Namely, in case of having pre-stored information or not moving after power-off, the UE 1 can perform V2X communication using pre-stored information even before completing an access to the network or receiving information of a cell at a current location.

Meanwhile, the network may instruct each UE whether the corresponding UE can perform an operation before a network access or a cell information reception, in advance. In this case, each UE can perform the V2X communication according to the aforementioned embodiment only if the above operation is allowed by the network.

In order to determine whether to allow UEs to perform the V2X communication before the network access completion or the cell information reception, the network may beforehand receive information required for determining whether to allow the UEs to perform the V2X communication from the UEs. For example, each UE may inform the network of a presence or non-presence of a V2X UE installed in the vehicle, a presence or non-presence of possibility of movement after access release or power-off, or a presence or non-presence of capability of sensing a location change of the corresponding UE.

According to the above-mentioned process, the UE 1 having the power turned on skips a cell search process for a network access and is able to restore a connection to the network by utilizing pre-stored information on a cell previously accessed by the UE 1. Meanwhile, the step S930 is described in detail with reference to FIG. 10 as follows.

As described above, in order to establish a PDN connectivity while the UE 1 performs the attach procedure to the network, relatively more signaling and time is required in comparison with the property of V2X communication. To resolve such a point, a network attach procedure of a V2X UE can be performed as proposed in FIG. 10.

FIG. 10 shows a process for performing a network access without PDN connectivity (or IP assignment). Namely, in order for a UE 1, which is a V2X UE installed in a vehicle, to be faithful to the purpose of performing V2X communication with nearby vehicles, the UE 1 can access a network without PDN connectivity or IP assignment for receiving a service from a network.

First of all, if a power of a UE 1 is turned on (or, UE 1 awakes from a sleep mode or a power saving mode), an NAS end of the UE 1 makes a request for an accessible network list to an AS end and selects a network to use. In doing so, as described in FIG. 9, a cell beforehand retained by the UE 1 (e.g., a cell previously accessed before a network access release) may be selected.

Subsequently, the UE 1 establishes an RRC connection to an eNB [S1010] and transmits an attach request message to an MME [S1020]. In the attach request message sent to the MME by the UE 1, at least one of an indicator indicating that the UE 1 is a user equipment performing V2X communication and an indicator indicating that PDN connectivity (or IP assignment) is unnecessary can be included. Namely, since the UE 1 performs V2X communication with a V2X UE installed in a different vehicle but does not need to perform an internet service and the like, the UE 1 informs the MME that a quick network access should be performed. Such an indicator can be represented through a specific value indicating V2X in an attach type field or another value indicating 'attach without internet connection). Or, the indicator may be designated as a separate value discriminated from "EPS Attached", "combined EPS/IMSI attach", "EPS emergency Attach", and "reserved" values.

The MME confirms that the PDN connectivity (or IP assignment) to the UE is not necessary from the attach request message received from the UE 1. Hence, the MME does not set up a user plane for the UE 1 through SGW/PGW. Such a process should be distinguished from a process for the MME to unconditionally transmit a create session request to the SGW in response to the attach request made by the UE. So to speak, while the SGW and PGW are not aware that the UE is a UE installed in a vehicle or that the UE is attached, the UE may access the network.

Meanwhile, the MME is provided with information required for authentication of the UE 1 by HSS and then checks whether the UE 1 is a UE approved to perform V2X communication, a valid UE or the like [S1030]. Through an authentication process for the UE 1, the MME transmits an attach accept message to the eNB [S1050]. Such a message is a message informing the UE 1 that the access to the network is complete without PDN connectivity (or, IP assignment) and may be delivered together with an initial context setup request message sent to the eNB by the MME [S1040].

Meanwhile, since it is unnecessary for the MME to assign an IP to the UE 1, information on SGW is not included in a message sent to the eNB by the MME. Moreover, if information on SGW is not included in a message received from the MME, the eNB does not perform a setup process led to the SGW. The eNB forwards the attach accept message received from the MME to the UE 1 [S1050].

In order to inform the UE 1 that the attach without the PDN connectivity is achieved in the step S1050, the MME can use an EPS attach result value. For instance, in order to indicate that the attach of the vehicle UE us achieved, the EPS attach result value may have a value 'vehicle attach'. Or, in order to indicate that the attach without the PDN connectivity is achieved, the EPS attach result value may have a value 'attached without PDN connectivity'. Or, the EPS attach result value is a value different from "EPS Attached" or "combined EPS/IMSI attach" and can inform the UE that the attach without PDN connectivity is achieved.

If an attach accept message is received, the UE 1 determines that the UE 1 is successfully attached to the network. If information on IP assignment related to the SGW and/or the PGW is not included in the attach accept message and the UE 1 announces that PDN connectivity (or IP assignment) is not necessary in the attach request process, the UE 1 determines that the attach without the PDN connectivity and the IP assignment is complete and then transmits an attach complete message to the MME [S1060]. Although the UE 1 fails to receive assignment of an IP address in the attach process, the UE 1 does not regard it as an error and does not make an IP address assignment request using DHCP (dynamic host control protocol) thereafter.

Meanwhile, if information on IP assignment and/or PDN connectivity is included in the attach accept message from the MME despite that the UE 1 announces that PDN connectivity and IP assignment are not necessary, the UE 1 determines that an error is generated. Namely, the UE 1 may release the RRC connection by determining that the UE 1 has accessed an abnormal network.

Although the above process is described with reference to the attach request process, it may apply to such a process as TAU (tracking area update) or RAU (routing area update). For example, if a UE, which is currently attached to a network in a state that information on PGW/SGW or IP is assigned, needs further IP assignment or does not need further PDN connectivity, the UE 1 can announce that PDN connectivity or IP assignment is not further necessary through such a process as TAU/RAU or the like.

Through the above described process, the network can selectively determine whether to assign IP to each UE. Since a vehicle having subscribed to a V2X service expects that safety of driver and pedestrian is secured, the vehicle does not desire to subscribe to a multimedia service and the like through an internet access. Actually, in case of web surfing or watching a video while driving, it is more difficult to secure safety. Hence, if a UE installed in a vehicle registers at a network to receive a V2X service, internet connectivity should be provided only if a service through internet is necessary. Particularly, since SGW/MME/PGW or the like should assign and manage an IP address and a content each time internet connectivity is provided to a UE, reducing unnecessary management elements is more efficient in aspect of reducing network load as well.

Meanwhile, while operating by performing V2X communication only, the UE 1 may desire to be provided with a service such as a TV broadcast, a streaming service, a web search and the like through an internet server. In such a case, PDN connectivity to PGW/SGW should be established for the UE 1 and IP should be newly assigned. Such a process is described with reference to FIG. 10.

An operation for the UE 1 to request PDN connectivity or IP assignment can be performed through various processes such as a PDN connectivity request procedure, an attach request procedure, a TAU procedure and the like. TAU is taken as one example for the description with reference to FIG. 10.

The UE 1 determines to switch to an IP assigned state from a state of absence of PDN connectivity to PGW/SGW or a non-IP-assigned state through an inner triggering [S1110]. Subsequently, the UE 1 establishes RRC connection to an eNB [S1115].

The UE 1 transmits a TAU request message to an MME through RRC connection [S1120]. And, the TAU request message may contain at least one of an indicator indicating that the UE 1 can request a service other than V2X communication, an indicator requesting a use of an internet service, an indicator indicating that PDN connectivity is necessary, and an indicator indicating that IP assignment is necessary. In response to the request of the UE 1, the MME performs an action for creating a context of the UE 1 through SGW/PGW. If it is determined that authentication or verification of the UE 1 is necessary in the step S1120, the MME performs an authentication procedure for the UE 1 with an HSS [S1125]. And, such a process may be skipped.

The MME transmits a create session request message to the SGW [S1130]. And, the create session request message is forwarded to the PGW from the SGW [S1135]. Through the create session request message, a process for creating PDN connectivity for the UE 1 and assigning IP to the UE 1 is initiated. The PGW transmits a create session response message to the SGW. And, the SGW forwards the create session response message to the MME [S1140, S1145]. The create session response message may contain TEID (tunnel ID) which will be used for an uplink data packet flow from the UE.

The MME transmits a TAU accept message to the eNB in a manner that information of the REID forwarded from the SGW is included in the message [S1155]. And, the eNB uses TEID to deliver uplink data received from the UE. Meanwhile, the eNB forwards the TAU accept message to the UE, and information indicating that the IP assignment requested by the UE is successfully achieved is contained in the TAU accept message [S1155]. A process for announcing that a content of the UE is set up together with the TAU accept message may be performed [S1150].

Based on the received TAU accept message, the UE 1 confirms whether the UE 1 successfully receives assignment of IP (i.e., whether PDN connectivity is established) [S1160]. Such a process can be understood as a process for the UE to announce that the UE will use the IP assigned to itself by transmitting a TAU complete or confirm message to the MME [S1160]. In addition, the eNB transmits a response message of confirming that the UE content is set up to the MME [S1165]. The eNB can inform the MME that downlink data should be transmitted through a specific path, and TEID information for the downlink data transmission may be sent together in the step S1165.

The MME forwards the TEID information received from the eNB to the SGW through a modify bearer request message [S1170], and the SGW can retransmit TEID information of its own to the PGW in a similar manner [S1175]. Through the TEID information, each of the PGW and the SGW can confirm that downlink data to the UE should be transmitted through prescribed ports or paths of the SGW and the eNB. Subsequently, the PGW and the SGW transmit modify bearer response messages to the SGW and the MME, respectively, whereby the TAU process ends [S1180, S1185].

In the above description, the process (FIG. 10) for the UE to access the network without PDN connectivity and/or IP assignment and the process (FIG. 11) for the UE to request PDN connectivity and/or IP assignment in the course of network access are described through V2X UE. Yet, such an operation is applicable to a general communication system as well as to a V2X communication environment. For example, as an IoT (Internet of Things) environment is established, objects failing to access a communication network previously can transceive data by being connected through Internet. Yet, since those many objects have limitations on memory, battery, CPU and the like, they should be implemented concisely. Therefore, if those things are enabled to communicate by implementing an IP protocol, it may result in lowering the utility of the UE.

Accordingly, those objects can be implemented to communicate with cellular communication network nodes without IP assignment by avoiding implementation of IP protocol. Moreover, it may be able to implement a scheme that specific network nodes having received data, which are not based on IP protocol or does not use IP, from the objects communicate with an outside of a cellular communication network through a process for applying an IP protocol to data.

According to the above scheme, a network should determine to assign IP to prescribed UEs to use an IP packet used communication and not to assign IP to use non-IP packet based communication. Therefore, as described with reference to FIG. 9, a process for the network to obtain situation information of the UE is required and a process for networks nodes not to fall into an error situation is required as well.

In other words, the aforementioned operations are EPS operations without IP connection and do not involve SGW and PGW in TAU/RAU operation or the like as well as in an attach procedure for a V2X UE, a UE for which IP assignment is unnecessary, or a UE for which PDN connectivity is unnecessary. To support such an operation, information indicating the above operations may be stored to context information of HSS and MME. For example, a field 'PDN-less operation' is defined in each of ME and HSS. If a value corresponding to the corresponding field is set, the MME can operate with the UE without exchange with SGW/PGW. For another example, if a value of the field 'PDNless operation' is set, it is possible for the MME to transmit a TAU accept message to the UE without exchanging a message with the SGW in the TAU process.

The step S940 is described in continuation with the step S930 in FIG. 9. Separately from a process for accessing the network using the pre-stored information in the step S930, the UE 1 can perform V2X communication using a preconfigured (or preset) resource. Namely, in case that a specific resource region to be used for the V2X communication is already set for the UE 1, as an engine of a vehicle is started, if the UE 1 awakes from a sleep mode or a power saving mode or a power of the UE 1 is turned on, the UE 1 can immediately initiate the V2X communication suing the preset resource region without a process of receiving allocation of a new resource region [S940]. This means that the V2X communication process of the step S940 can be performed separately from the attach process of the step S930.

A vehicle instantly moves as soon as an engine is started. And, information related to safety should be always transmitted and received while a vehicle is driven. Hence, a resourced resource, which can be used irrespective of whether the network is accessed, may be set for the UE 1 supportive of V2X. Hence, once the engine of the vehicle is started, the UE 1 can instantly perform V2X communication using the corresponding resource without waiting for a network access and a resource allocation.

Figure 12:
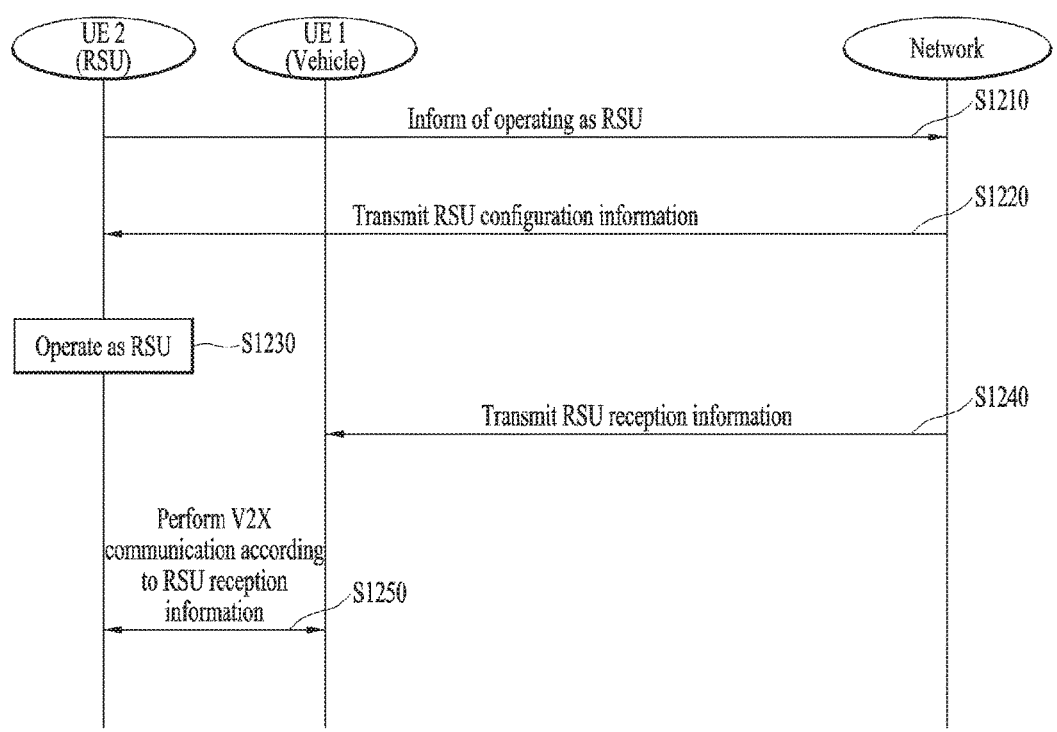

Meanwhile, with respect to the process for specifying a resource region in the step S940, FIG. 12 is described. In a V2X communication system, an RSU relays a V2X message between vehicles or broadcasts information related to vehicle safety. As described above, the RSU can be implemented with a stationary UE. Since a base station configuring a cell handles a wide-ranging area, it has a high output power and a stationary frequency. On the other hand, since an RSU UE uses relatively small power unlike the base station, it is not easily recognizable by vehicle UEs nearby. Nonetheless, since information transmitted by the RSU UE is the information related to traffic safety, it should be received by the vehicle UEs easily and clearly. Particularly, since each of the RSU UE and the vehicle UE is implemented as a UE (user equipment), it may cause a problem that collision may occur between the RSU UE and the vehicle UE in the course of occupying cell resources and having the cell resources allocated thereto. To improve this, it is intended to improve a process for delivering information on an RSU UE to a vehicle UE, which is described in detail with reference to FIG. 12.

First of all, a UE 2 operating as an RSU informs a network that the UE 2 will operate as the RSU [S1210]. A network node informed of operating as the RSU may become an MME or HSS, and the UE 2 may inform that it will operate as the RSU in a process for registration to the network. If the UE 2 is approved to operate as the RSU, the network transmits RSU configuration information to the UE 2 together with a registration response message [S1220]. The RSU configuration information may instruct the UE 2 to transmit what kind of information (e.g., broadcasting of information related to traffic safety and/or information delivery between vehicle UEs).

As another method of informing that which UE operates as an RSU, for example, as the UE establishes connection to an eNB, the MME or the HSS may inform the eNB that the connected UE 2 operates as the RSU. In this process, when the UE 2 informs the network that it operates as the RSU, it can use an attach request message, a TAU request message or the like. Thereafter, the UE 2 receives an attach accept message or a TAU accept message from the network and is able to obtain information, which indicates that the UE 2's operation as the RSU is allowed, from the received message.

A specific network node may forward information, which indicates that a UE operates as an RSU, to another network node. For example, information (e.g., information on an IP address) on the UE 2 operating as the RSU can be shared with another network node or a UE 1 installed in the vehicle. Thus, based on the information shared between networks, a specific network node (e.g., eNB) can transmit an IP packet, of which destination IP is set to the UE 2 operating as the RSU, among IP packets received by the specific network node to the UE 2 directly instead of forwarding the corresponding IP packet to the SGW. Through this, RTT (round trip time) is improved and vehicle driving information can be quickly delivered among vehicle UEs.

Or, a specific network node (e.g., MME) can inform another network node (e.g., eNB) of TFT (traffic flow template) corresponding to such an IP packet. And, a network node can inform another network node that IP packets should be forwarded to the UE 2 through which bearer among bearers allocated to an RSU UE. Moreover, a network node may inform another network node that a local routing is necessary for each network node.

If the eNB is informed that the UE 2 operates as the RSU, the eNB may allocate a resource, which is to be used for a process for operating as the RSU, to the UE 2. And, information on the allocated resource may be sent as another RSU configuration information to the UE 2 from the eNB. For example, information on a location of a resource region allocated to the UE 2, information indicating when a corresponding resource region will be used, information indicating that a resource region should be used to transmit prescribed information, configuration information of PHY/MAC/RLC layer related to an allocated resource and the like can be sent as RSU configuration information from the eNB. Based on the received information, the UE 2 performs data transmission.

According to another example, before RSU configuration information on a resource region is received from the eNB, the UE 2 may first make a request for allocation of a resource region to the eNB. For example, the UE 2 makes a request for an amount of a resource required for the UE 2 to operate as the RSU, location information of a resource region and the like to the eNB, and the eNB is then able to transmit information on the resource region to the UE 2 in response to the request.

According to further example, in order to allocate a resource to a UE operating as an RSU most efficiently, the eNB may make a request for a transmission of specific information to the UE 2 operating as the RSU. For example, a request for an amount of a necessary resource, an amount of data to transmit, or a data rate may be made to the UE 2 operating as the RSU.

Meanwhile, having received the RSU configuration information, the UE 2 operates as the RSU [S1230]. For example, the UE 2 may broadcast traffic related information or relay V2X communication between vehicle UEs.

Separately from transmitting RSU configuration information to the UE 2, the eNB transmits RSU reception information to the UE 1 located within the cell. Here, the UE 1 is a vehicle UE installed in a vehicle moving around the UE 2. The RSU reception information is information on the UE 2 operating as the RSU, can be transmitted to the UE 1 by the eNB through broadcasting of SIB (system information block) or the like instead of being sent to the UE 1 by the UE 2, or may be directly indicated in form of an individual message in case that the UE 1 establishes RRC connection to the eNB. Namely, information on an RSU UE can be announced through a process for the eNB to inform vehicle UEs of the RSU UE located within the cell coverage of the eNB.

In this case, the RSU reception information may include location information indicating a location of the RSU UE, information indicating whether a UE located in a prescribed range or area from the RSU UE should receive the corresponding information, identification information of the RSU UE for identifying RSU from another vehicle UE, information indicating an information transmitted timing of the RSU UE, information indicating what kind of information is transmitted, information indicating what kind of resource is used to transmit information, and the like. Having received the RSU reception information, the UE 1 performs V2X communication with the UE 2 operating as the RSU according to the RSU reception information.

The step S940 of FIG. 9 is described again as follows. First of all, the UE 1 communicates with another UE using a preconfigured resource. In doing so, if the UE 2 is the RSU UE described in FIG. 12, the preconfigured resource used by the UE 1 may include a specific resource region set from the RSU reception information. So to speak, a resource region preconfigured by the eNB for communication between a vehicle UE and an RSU UE can be used in the step S940. If a power is turned on, the UE 1 can perform communication with the UE 2 using the corresponding resource region without a network access.

Meanwhile, in case that the UE 2 is not an RSU UE but a general UE, it may operate differently. Namely, if the UE 2 is not the RSU UE of FIG. 12 but is a vehicle UE, the preconfigured resource region of the step S940 may include a part except a resource region of the RSU UE. So to speak, since the resource region of the RSU UE should be preferentially secured to transmit safety information, it should not be allocated to data transmission between vehicle UEs. Hence, in a process for the UE 1 to perform V2X communication with another vehicle UE using a preconfigured resource, a resource except a resource region allocated to the RUS UE can be used according to RSU reception information.

Such a process is further described as follows. A vehicle UE performs the following operation. The vehicle UE checks whether RSU reception information is transmitted from a cell in which the vehicle UE stays. After checking whether SIB defined for a V2X operation exists, the vehicle UE determines that the current cell supports the V2X operation. Subsequently, the vehicle UE checks whether the SIB defined for the V2X operation is transmitted by containing RSU reception information.

If the RSU reception information is transmitted from the cell at which the vehicle UE is located, the vehicle UE performs a reception operation according to the indication indicated by the RSU reception information. Particularly, when location information of RSU is included in the RSU reception information, if the vehicle UE is located within a predetermined distance from the RSU, the vehicle UE attempts reception of the information transmitted by the RSU. Moreover, the vehicle UE checks when the RSU transmits data using the RSU reception information and then attempts reception of information/data from the corresponding RSU at an indicated timing. Moreover, if information on a resource used by the RSU is contained in the RSU reception information, the vehicle UE attempts reception of information/data using the indicated resource.

With reference to FIGS. 9 to 12, UE's operations according to an engine start of a vehicle are described. In the following, various embodiments of operations of a UE installed in a vehicle in the course of driving the vehicle are described with reference to FIGS. 13 to 15.

Figure 13:
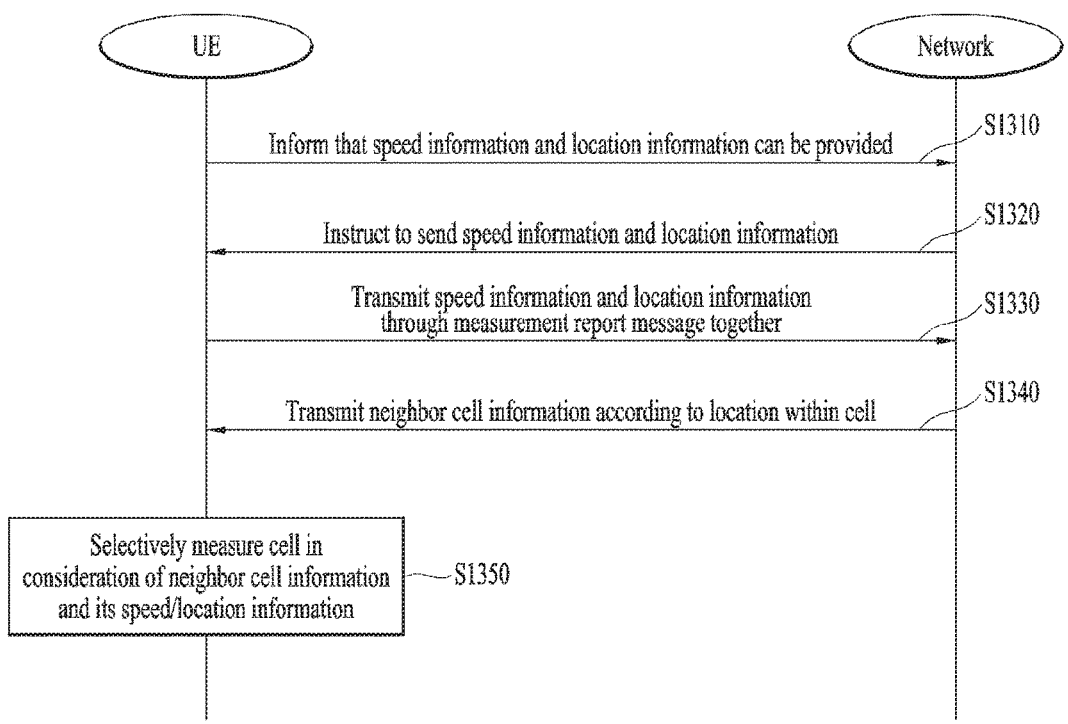

Since a UE installed in a vehicle is assumed as moving at any time according to a driving of the vehicle, a network should operate in consideration of possibility of handover of the UE. With respect to handover, the UE should consider measurement on an ambient cell, and a vehicle UE is characterized in moving on roads only and also moving in a specific direction only in a central reservation installed area like a highway. In FIG. 13, proposed is an effective measurement process in consideration of the above characteristics.

First of all, a vehicle UE informs a network that the vehicle UE can provide speed information and location information [S1310]. Such informations may be sent to eNB, MME, HSS and the like of the network and forwarded through various messages as an RRC connection request, an attach request, a TAU and the like. A network node recognizes that the UE can provide the speed information and the location information and then instructs the UE to transmit the speed information and the location information [S1320]. Such a process may be performed through various messages such as transmission of RRC or NAS message, message transmission on MAC, RLC or PDCP layer, and the like. And, the UE is also instructed to transmit the speed information and the location information on a prescribed condition. For example, the network node may instruct the UE to report the speed information to the network if the UE reaches a specific speed. And, the network node may also instruct the UE to report direction information together with the speed information. Moreover, the UE may be instructed to make a report through a prescribed message when reporting the speed information to the network. Likewise, a condition for the location information report may be set for the UE as well.

The UE, for which the report of the speed information and the location information is set, transmits the speed information and the location information to the network according to the settings from the network [S1330]. For example, if it is set to transmit the speed information and the location information together with a transmission of a measurement report message, the UE may transmit the speed information and the location information of its own when transmitting a measurement report to the network.

Meanwhile, the network can inform the UE of information on an ambient cell through SIB in each cell. In addition, according to a proposed embodiment, the network can additionally inform the UE how information on each cell will be applied according to a location within a coverage when transmitting information on each cell to the UE [S1340]. So to speak, the network node can inform the UE of neighbor cell information determined differently according to UE's location within a cell.

In particular, consider a case that a cell B and a cell C exist on left and right sides of a specific cell A, respectively. In this case, it is effective that UEs on the left side with reference to a center of the cell A perform measurements on the cell B only and that UEs on the right side perform measurements on the cell C only. Hence, when transmitting information on an ambient cell from a prescribed cell, the network sets measurement/monitoring target cells differently according to where the UE is located within a cell by setting a location condition and is able to inform the UE of the settings.

Information on the cells becoming the targets to be measured/monitored by the UE may be specified to cells to be measured in an area within a prescribed radius centering on specific coordinates. Or, an area for performing measurement/monitoring on a specific cell may be designated through 4 coordinates.

Having received the neighbor cell information determined differently according to a location within a cell, the UE compares the information received from the network node with a location of its own and then performs cell measurement on a cell selected in consideration of the neighbor cell information, its location information and/or speed information only [S1350]. Particularly, the UE selectively performs measurement/monitoring on neighbor cells, which may affect the UE according to a movement of the UE, in consideration of a location, a moving direction and a moving speed of its own.

Alternatively, an operation of making a determination with reference to speed information instead of making a determination made with reference to a location (e.g., location criterion) is also possible. Namely, criterion information on a speed per cell is sent, whether a speed of a UE satisfies the criterion information is checked, and measurement may be performed on a satisfied cell only.

According to a related art, a UE scans and measures a whole neighbor cell list contained in SIB. Yet, a UE installed in a vehicle may selectively reduce measurement targets owing to the features related to a vehicle movement. Particularly, in case that a vehicle movement is specified into one direction like a highway, cells to be measured/monitored by a UE can be reduced rapidly.

Figure 14:
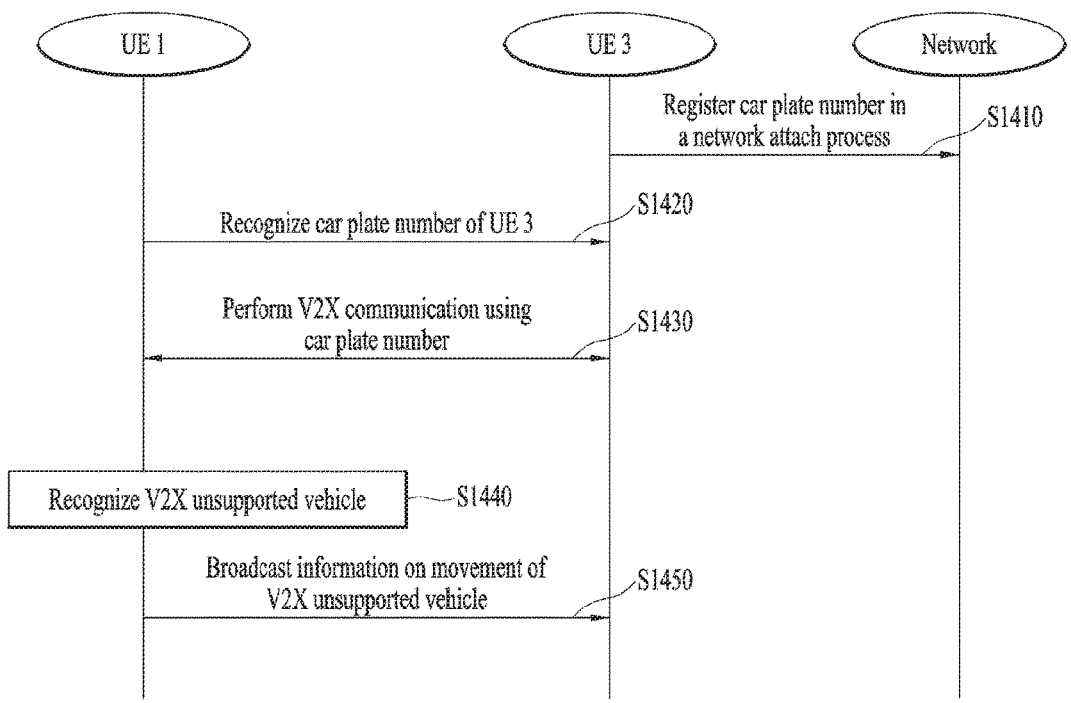

FIG. 14 illustrates a V2X communication process between a UE 1 installed in a currently moving vehicle and another vehicle UE. According to an embodiment shown in FIG. 14, the UE 3 registers a car plate number at a network in a process for accessing a network. Namely, as identity information, the UE 3 may use a car plate number together with a network identifier such as IMSI (International Mobile Subscriber Identity), S-TMSI (SAE-Temporary Mobile Subscriber Identity), IMEI (International Mobile Station Equipment Identity) and the like.

The UE 1 installed vehicle recognizes the UE 3 installed vehicle while driving and is able to recognize a car plate number using sensors for collecting visual information [S1420]. If the car plate number of the UE 3 installed vehicle is confirmed, the UE 1 requests a communication path with the UE 3 through the network. In this case, the UE 1 can initiate the creation of the communication path for V2X communication with the UE 3 by transmitting the car plate number to a network node despite failing to be aware of information on the network identifier of the UE 3 at all. So to speak, a car plate number of a vehicle having a V2X supportive UE installed therein plays a role as a network identifier of the UE in direct.

If the creation of the communication path is requested using the car plate number of the UE 3, the network node can create the communication path between the UE 1 and the UE 3 by comparing a car plate number pre-registered for the UE 3 with the network identifier of the UE 3. Hence, the UE 1 can perform V2X communication with a car plate number only despite failing to be aware of the network identifier of the UE 3 [S1430].

Meanwhile, in case of the UE 3, even if a car plate number of the UE 3 is registered at the network, the UE 3 may not want communication initiation from an information-less UE like the UE 1. So to speak, the UE 3 may be set to reject V2X communication using a car plate number only. In the process [S1410] for the UE 3 to register the car plate number at the network, whether to accept a car plate number as a network identifier can be sent together. Hence, the V2X communication from the UE 1 may be rejected. Yet, although the UE 3 is set to reject V2X communication using a car plate number only, V2X communication from a vehicle for the public interest (e.g., ambulance, police car, etc.) may be unconditionally accepted for the corresponding purpose.

Although V2X communication using a car plate number is described in the above, a VIN (vehicle identification number) may be used instead of the car plate number.

In the following, a V2X communication method in case of finding a V2X unsupported vehicle while driving is described. While the UE 1 and the UE 3 are moving by performing V2X communication, the UE 1 finds a V2X unsupported vehicle [S1440]. The V2X unsupported vehicle may be found using sensors installed in the UE 1 installed vehicle, e.g., using such technologies as RADAR (RAdio Detection And Ranging), LIDAR (Light Detection And Ranging), etc. When the UE 1 finds a specific vehicle while driving, although a procedure of V2X communication using a car plate number is initiated according to the step S1420, if any response is not received from the corresponding UE, the UE 1 may recognize that the corresponding vehicle does not support V2X.

Although the vehicle found by the UE 1 does not support V2X, information (e.g., moving speed, moving direction, etc.) on a movement of the vehicle can be measured. Namely, the UE 1 installed vehicle consistently collects information on the movement of the V2X unsupported vehicle using the aforementioned sensors, and the UE 1 broadcasts the collected information to ambient UEs [S1450]. Namely, the UE 1 informs the ambient UEs including the UE 3 of information on the moving path and speed of the V2X unsupported vehicle, thereby enabling other UE installed vehicles to recognize and pay attention to the V2X unsupported vehicle.

Figure 15:
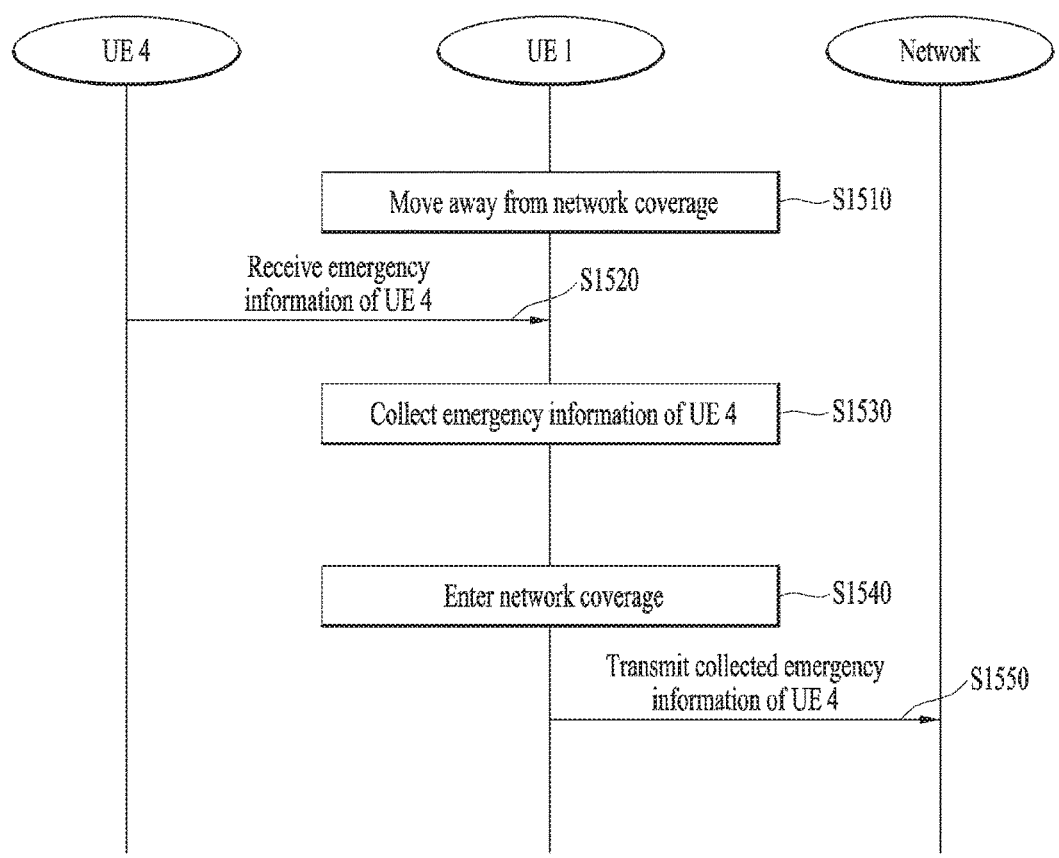

FIG. 15 is a diagram to describe an embodiment for a UE 1 to collect emergency information from another UE 4 supportive of V2X. The UE 1 may move away from a network coverage while driving [S1510]. How the UE 1 will operate in case of receiving information received from anther UE on moving away from the network coverage can be set by a network in advance. For example, the UE 1 may be set to collect a message of a specific type (e.g., emergency message, traffic accident message, weather related message, etc.) among V2X messages received from another UE out of the network coverage.

Hence, the UE 1 receives emergency information from the UE 4 while driving out of the network coverage [S1520]. The emergency information may include various types of informations such as information indicating an accident occurrence in a UE 4 installed vehicle, information indicating an ambient forest fire, information indicating an occurrence of an icy road due to unexpected bad weather, etc. The UE 1 collects and stores the emergency information received from the UE 4 [S1530].

Meanwhile, the UE 1 may selectively store the received information. Namely, in case (e.g., recognizing a forest fire in advance, etc.) of previously recognizing some of informations received from the UE 4 before moving out of the network coverage, if the same information is received from the UE 4, the UE 1 does not need to store the corresponding information. Hence, the UE 1 can collect and store information different from the former information retained before getting out of the network coverage.

Subsequently, if the UE 1 enters the network coverage by continuing to drive [S1540], the UE 1 transmits the collected emergency information of the UE 4 to the network [S1550]. Although data is received from the UE 4 using V2X communication, it is unable to inform the network out of the network coverage, the collected data is sent to the network after the network has been entered. In the step S1550, the UE 1 may also report a fact that the UE 1 out of the network could not immediately report the information received from the UE 4.

In such a process, an application for storing V2X communication or data may be different from an entity that actually manages a communication state. Hence, each time whether the communication state managing entity is in or out of the network coverage is changed, the communication state managing entity should inform the application of the change. Based on this, if receiving information indicating a presence out of the network coverage from a lower layer, an application layer stores a V2X message from another vehicle. Subsequently, the application layer may stop or hold a creation of a V2X message created for requesting a transmission by the application layer.

Moreover, the UE 4, which used to exist out of the network coverage, may inform the UE 1 whether the information sent by the UE 4 is stored and then forwarded to the network by the UE 1 on entering the coverage again. Namely, when a message is received while driving, if information indicating that the corresponding message should be stored and forwarded within a coverage is contained in the received message, the UE 1 stores the corresponding message and is then able to report the corresponding message to the network on entering the network coverage.

So far, V2X communication methods according to various cases are proposed. The aforementioned embodiments may be performed independently or two or more embodiments may be performed complexly together. The proposed embodiments are applicable not only to a V2X communication environment limitedly but also to various other communication environments identically or similarly.

4. Device Configurations

Figure 16:
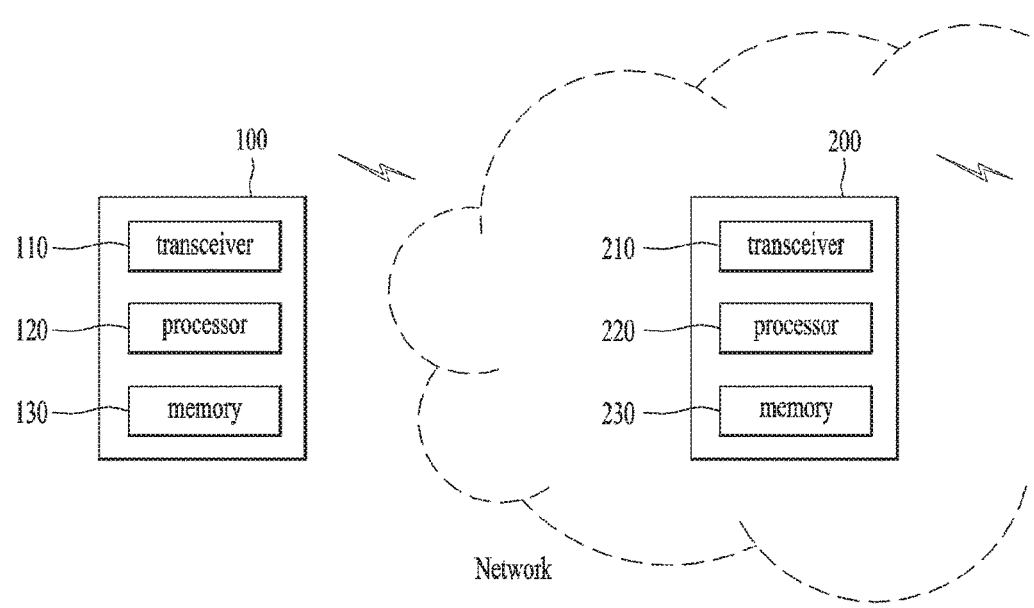
FIG. 16 is a diagram showing a configuration of a node device according to a proposed embodiment.

FIG. 16 is a diagram illustrating configurations of node devices according to a proposed embodiment.

A user equipment (UE) 100 may include a transceiver 110, a processor 120, and a memory 130. The transceiver 110 may be configured to transmit and receive various signals, data, and information to/from an external device. Alternatively, the transceiver 110 may be implemented with a combination of a transmitter and a receiver. The UE 100 may be connected to the external device by wire and/or wirelessly. The processor 120 may be configured to control overall operations of the UE 100 and process information to be transmitted and received between the UE 100 and the external device. Moreover, the processor 120 may be configured to perform the UE operation proposed in the present invention. The memory 130, which may be replaced with an element such as a buffer (not shown in the drawing), may store the processed information for a predetermined time.

Referring to FIG. 16, a network node 200 according to the present invention may include a transceiver 210, a processor 220, and a memory 230. The transceiver 210 may be configured to transmit and receive various signals, data, and information to/from an external device. The network node 200 may be connected to the external device by wire and/or wirelessly. The processor 220 may be configured to control overall operations of the network node 200 and process information to be transmitted and received between the network node device 200 and the external device. Moreover, the processor 220 may be configured to perform the network node operation proposed in the present invention. The memory 230, which may be replaced with an element such as a buffer (not shown in the drawing), may store the processed information for a predetermined time.

The specific configurations of the UE 100 and the network node 200 may be implemented such that the aforementioned various embodiments of the present invention can be independently applied or two or more embodiments can be simultaneously applied. For clarity, redundant description will be omitted.

The embodiments of the present invention may be implemented using various means. For instance, the embodiments of the present invention may be implemented using hardware, firmware, software and/or any combinations thereof.

In case of the implementation by hardware, a method according to each embodiment of the present invention may be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code may be stored in a memory unit and be then executed by a processor. The memory unit may be provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Therefore, the present invention is non-limited by the embodiments disclosed herein but intends to give a broadest scope matching the principles and new features disclosed herein.

INDUSTRIAL APPLICABILITY

The aforementioned V2X communication method is applicable to various wireless communication systems including an IEEE 802.16x system and an IEEE 802.11x system as well as to a 3GPP system. Moreover, a proposed method is applicable to an mmWave communication system that uses an ultra-high frequency band.

What is claimed is:
1. A method for a vehicle to everything (V2X) user equipment (UE) supporting a V2X communication to communicate with network nodes, the method comprising:
storing system information of a connected cell prior to releasing an access to a network;
determining whether new system information is needed to perform an access procedure, based on at least one of (i) whether a location of the V2X UE is changed or not, (ii) whether a timer for the stored system information expires or not, or (iii) whether a cell ID sensed after turning on a power of the V2X UE is identical to a cell ID included in the stored system information or not;
receiving from the network, an allowance indication indicating that establishment of a connection to a cell using the stored system information without a cell search process is allowed,
wherein the allowance indication is received based on at least one of (i) whether the V2X UE is installed in a vehicle, (ii) whether there is a possibility of moving of the V2X UE after releasing the access or after the power of the V2X UE is turned off, or (iii) whether the V2X UE has a capability of detecting that the location of the V2X UE is changed or not;
based on (i) determining that the new system information is not needed to perform the access procedure and (ii) the allowance indication being received, when the power of the V2X UE is turned on, establishing the connection to the cell, using the stored system information without the cell search process;
when the connection is established, transmitting an attach request message including an indicator indicating that packet data network (PDN) connectivity is not necessary, to the cell,
wherein the attach request message further comprises an indicator indicating that assignment of an Internet Protocol (IP) is not necessary; and
receiving an attach accept message indicating that a network access without the PDN connectivity is complete from the cell.

2. The method of claim 1, wherein the stored system information is used when the location of the V2X UE is identical to that before releasing the access to the network.

3. The method of claim 1, wherein the stored system information is used when the timer does not expire after a timing of releasing the access to the network.

4. The method of claim 1, wherein the stored system information is used when the cell ID sensed after turning on the power of the V2X UE is identical to the cell ID included in the stored system information.

5. The method of claim 1, wherein the attach accept message does not include information on a serving gateway (SGW).

6. The method of claim 1, wherein the determination of whether the new system information is needed to perform the access procedure or not is performed based on all of (i) whether the location of the V2X UE is changed or not, (ii) whether the timer for the stored system information expires or not, and (iii) whether the cell ID sensed after turning on the power of the V2X UE is identical to the cell ID included in the stored system information or not.

7. The method of claim 1, wherein the allowance indication is received based on all of (i) whether the V2X UE is installed in the vehicle, (ii) whether there is the possibility of moving of the V2X UE after releasing the access or the power of the V2X UE is turned off, and (iii) whether the V2X UE has the capability of detecting the location of the V2X UE is changed or not.

8. A vehicle to everything (V2X) user equipment (UE) communicating with network nodes, the V2X UE comprising:
a transmitter;
a receiver; and
a processor configured to operate by being connected to the transmitter and the receiver,
wherein the processor:
stores system information of a connected cell prior to releasing an access to a network,
determines whether new system information is needed to perform an access procedure, based on at least one of (i) whether a location of the V2X UE is changed or not, (ii) whether a timer for the stored system information expires or not, or (iii) whether a cell ID sensed after turning on a power of the V2X UE is identical to a cell ID included in the stored system information or not,
receive from the network, an allowance indication indicating that establishment of a connection to a cell using the stored system information without a cell search process is allowed,
wherein the allowance indication is received based on at least one of (i) whether the V2X UE is installed in a vehicle, (ii) whether there is a possibility of moving of the V2X UE after releasing the access or after the power of the V2X UE is turned off, (iii) whether the V2X UE has a capability of detecting that the location of the V2X UE is changed or not;

based on (i) determining that the new system information is not needed to perform the access procedure and (ii) the allowance indication being received, establishes the connection to the cell, using the stored system information without the cell search process, when the power of the UE is turned on, controls the transmitter to transmit to the cell an attach request message including an indicator indicating that packet data network (PDN) connectivity is not necessary, when the connection to the cell is established, wherein the attach request message further comprises an indicator indicating that assignment of an Internet Protocol (IP) is not necessary, controls the receiver to receive an attach accept message indicating that a network access without the PDN connectivity is complete from the cell.

* * * * *